US010955542B2

(12) United States Patent
Kishigami

(10) Patent No.: US 10,955,542 B2
(45) Date of Patent: Mar. 23, 2021

(54) RADAR APPARATUS AND DIRECTION-OF-ARRIVAL ESTIMATION DEVICE

(71) Applicant: Panasonic Intellectual Property Management Co., Ltd., Osaka (JP)

(72) Inventor: Takaaki Kishigami, Tokyo (JP)

(73) Assignee: Panasonic Intellectual Property Management Co., Ltd., Osaka (JP)

(*) Notice: Subject to any disclaimer, the term of this patent is extended or adjusted under 35 U.S.C. 154(b) by 210 days.

(21) Appl. No.: 16/169,474

(22) Filed: Oct. 24, 2018

(65) Prior Publication Data

US 2019/0137616 A1 May 9, 2019

(30) Foreign Application Priority Data

Nov. 9, 2017 (JP) ............................. JP2017-216682

(51) Int. Cl.
*G01S 13/48* (2006.01)
*G01S 13/42* (2006.01)
(Continued)

(52) U.S. Cl.
CPC ................ *G01S 13/48* (2013.01); *G01S 7/03* (2013.01); *G01S 13/42* (2013.01); *H01Q 21/065* (2013.01)

(58) Field of Classification Search
CPC ........... G01S 13/48; G01S 7/03; G01S 13/42; H01Q 21/065
(Continued)

(56) References Cited

U.S. PATENT DOCUMENTS 5,459,668 A * 10/1995 Dogan .................... G01S 3/043
342/153
7,714,782 B2 * 5/2010 Davis ....................... G01S 3/74
342/377
2014/0208845 A1 * 7/2014 Zlotnick ............... G01F 23/296
73/290 V

FOREIGN PATENT DOCUMENTS

JP   2008-096137 A   4/2008

OTHER PUBLICATIONS

Ilan Ziskind et al., "Maximum Likelihood Localization of Multiple Sources by Alternating Projection", IEEE Transactions on Acoustics, Speech, and Signal Processing, vol. 36, No. 10, Oct. 1988, pp. 1553-1560.
(Continued)

*Primary Examiner* — Frank J McGue
(74) *Attorney, Agent, or Firm* — Seed IP Law Group LLP

(57) ABSTRACT

In a direction estimator, a horizontal array maximum likelihood estimator calculates first maximum likelihood values corresponding to NW angles in a first direction by performing a maximum likelihood estimation process on the first direction using signals received by a first virtual linear array and extracts first candidate angles of arrival of incoming waves in the first direction. A vertical array maximum likelihood estimator calculates second maximum likelihood values corresponding to the NW angles in a second direction by performing a maximum likelihood estimation process on the second direction using signals received by a second virtual linear array and extracts second candidate angles of arrival of incoming waves in the second direction. A horizontal/vertical maximum likelihood estimator estimates, using the first and second candidate angles of arrival, angles of arrival of the NW incoming waves in a two-dimensional plane extending in the first and second directions.

7 Claims, 13 Drawing Sheets

(51) Int. Cl.
*H01Q 21/06* (2006.01)
*G01S 7/03* (2006.01)

(58) Field of Classification Search
USPC .......................................................... 342/147
See application file for complete search history.

(56) References Cited

OTHER PUBLICATIONS

Jian Li et al., "MIMO Radar with Colocated Antennas", IEEE Signal Processing Magazine, vol. 24, Issue: 5,Oct. 15, 2007, pp. 106-114.
Jeffrey A. Fessler et al., "Space-alternating generalized expectation-maximization algorithm", IEEE Transactions on Signal Processing, vol. 42, No. 10, Oct. 1994, pp. 2664-2677.

* cited by examiner

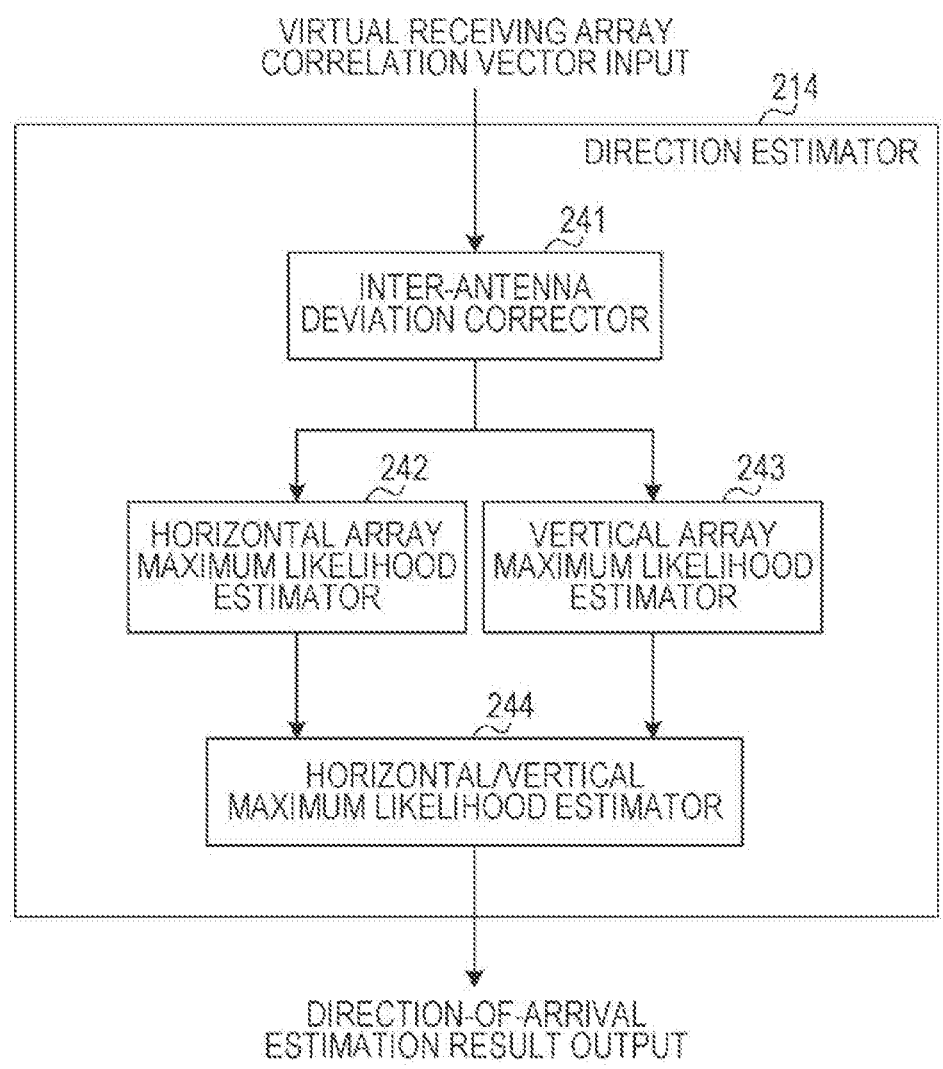

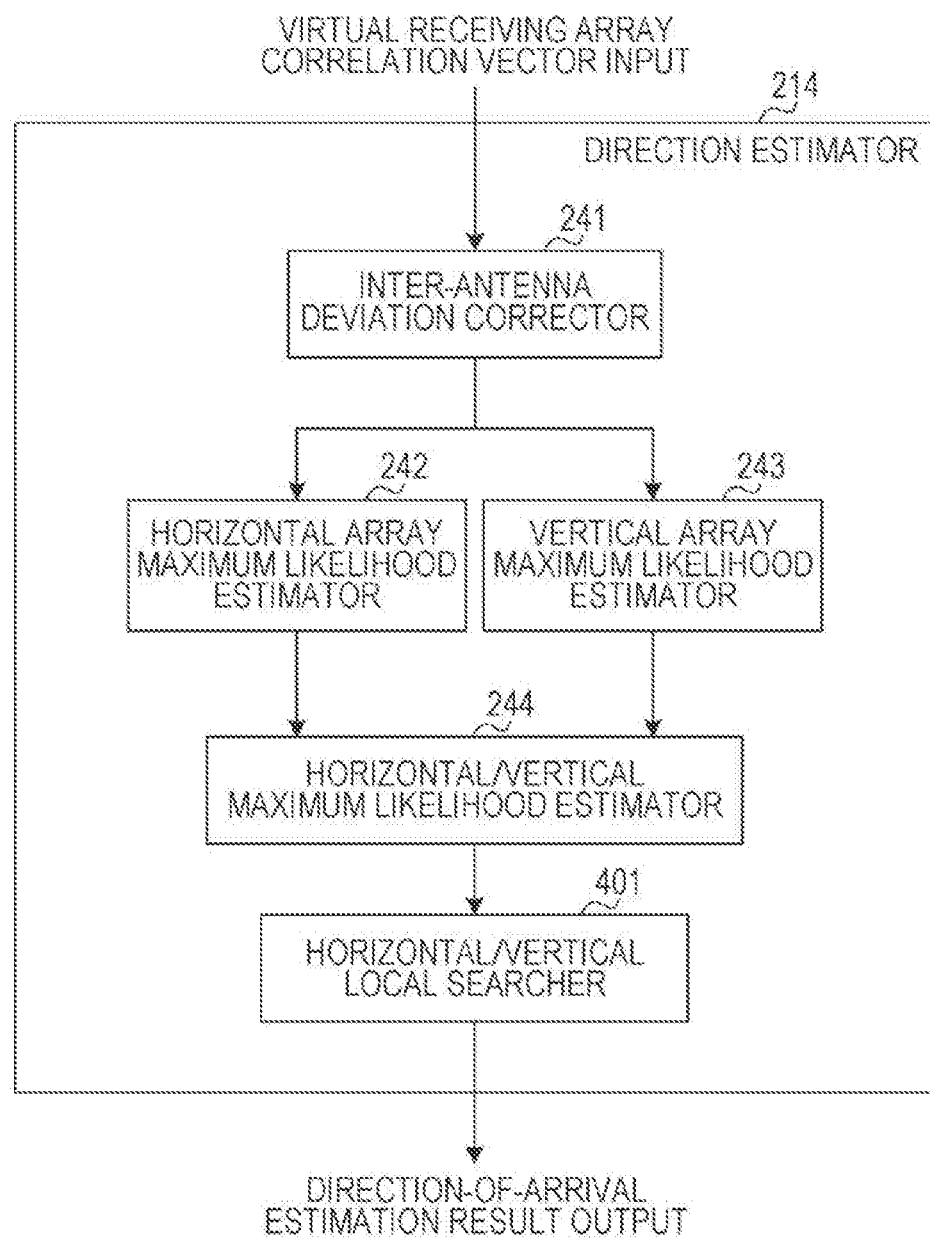

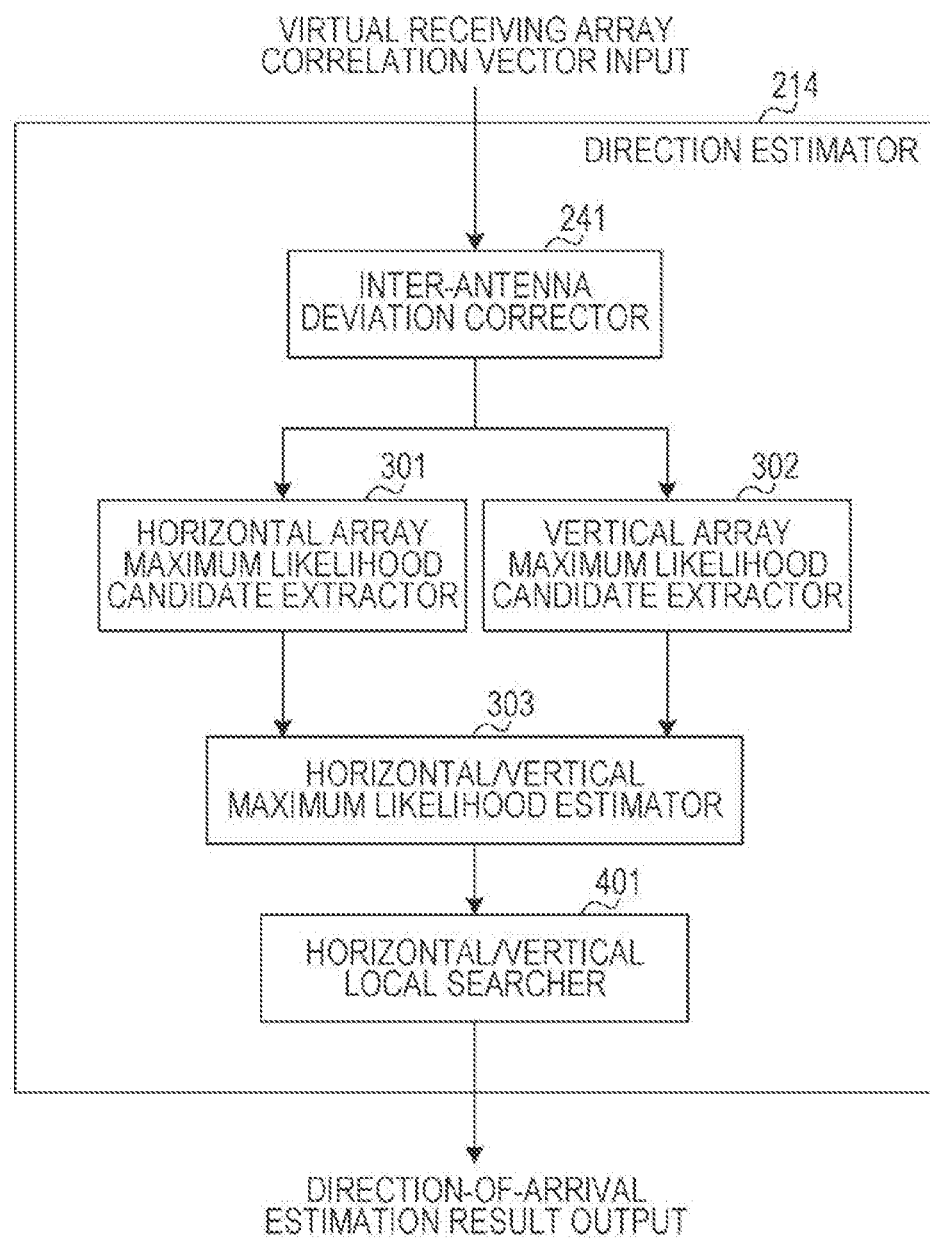

RADAR APPARATUS AND DIRECTION-OF-ARRIVAL ESTIMATION DEVICE

BACKGROUND

1. Technical Field

The present disclosure relates to a radar apparatus and a direction-of-arrival estimation device.

2. Description of the Related Art

In recent years, a radar apparatus has been under consideration which uses short-wavelength radar transmission signals including microwaves or millimeter waves that yield high resolution. Further, for improvement in outdoor safety, there has been a demand for the development of a radar apparatus (wide-angle radar apparatus) that detects objects (targets) including pedestrians, as well as vehicles, in a wide angular range.

For example, as a radar apparatus, a pulse radar apparatus has been known which repeatedly emits pulse waves. A signal that is received by a wide-angle pulse radar that detects a vehicle or a pedestrian in a wide angular range is one obtained by mixing a plurality of reflected waves from a target (e.g. a vehicle) that is present at a short distance and from a target (e.g. a pedestrian) that is present at a long distance. This requires (1) a radar transmitter to be configured to transmit a pulse wave or a pulse-modulated wave having an autocorrelation characteristic that forms a low-range side lobe (such a characteristic being hereinafter referred to as "low-range side lobe characteristic") and requires (2) a radar receiver to be configured to have a wide reception dynamic range.

Examples of how a wide-angle radar apparatus is configured include the following two configurations.

In the first configuration, radar waves are transmitted by mechanically or electronically scanning pulse waves or modulated waves with narrow-angle directional beams (with beams width of approximately several degrees), and reflected waves are received with narrow-angle directional beams. The first configuration requires much scanning for high resolution and, as such, is less capable of tracking a fast-moving target.

The second configuration employs a technique (direction-of-arrival (DOA) estimation) in which reflected waves are received by an array antenna constituted by a plurality of antennas (antenna elements) and the angles of arrival (direction of arrival) of the reflected waves are estimated by a signal-processing algorithm based on a phase difference in reception due to interelement spacings (inter-antenna spacings). The second configuration, which allows the angles of arrival to be estimated at a receiving branch even if scan intervals between transmission beams at a transmitting branch are skipped, achieves a reduction in scanning time and, as such, is higher in tracking capability than the first configuration.

Proposed examples of direction-of-arrival estimation methods include Fourier beamformer methods that give the same level of angular resolution as the beam width of an array antenna and high-resolution techniques that make it possible to achieve angular resolution which is narrower than the beam width of an antenna.

One of the high-resolution techniques is a maximum likelihood estimation method (see, for example, Ilan Ziskind and Mati Wax, "Maximum Likelihood Localization of Multiple Sources by Alternating Projection," IEEE Trans. On Acoustics, Speech, and Signal Processing, Vol. 36, No. 10, October 1988). A direction-of-arrival estimation method involving the use of the maximum likelihood estimation method is a technique for searching in search grids defined within an angle-of-arrival range at which incoming waves are expected to arrive for an incoming-wave angle (maximum likelihood value) at which an evaluation function derived on the basis of the principles of maximum likelihood estimation reaches its minimum or maximum. This evaluation function includes the number of incoming waves as a parameter.

The maximum likelihood estimation method is applicable to a direction-of-arrival estimation method regardless of the shape of an array antenna and, even in a case (coherent wave) where there is a high correlation between received signals of a plurality of incoming waves, can demultiplex the incoming waves with a high degree of accuracy.

SUMMARY

However, while a direction-of-arrival estimation method involving the use of the maximum likelihood estimation method can give superior angle measurement performance, a high-accuracy estimation of an angle of arrival (direction of arrival) requires finer search grids and may cause an increase in computational complexity for searches.

One non-limiting and exemplary embodiment provides a radar apparatus and a direction-of-arrival estimation device that make it possible to measure an angle with a high degree of accuracy while suppressing an increase in computational complexity.

In one general aspect, the techniques disclosed here feature a radar apparatus including: a transmitter that transmits a radar signal through a transmitting array antenna; a receiver that receives, through a receiving array antenna, a reflected-wave signal produced by the radar signal being reflected by a target; and a direction estimator that estimates an angle of arrival of the reflected-wave signal thus received, wherein the direction estimator includes a first estimator that, by performing a maximum likelihood estimation process on a first direction, calculates, using signals received by a first virtual linear array constituted by virtual receiving antennas, linearly arranged in the first direction, that belong to a plurality of virtual receiving antennas included in a virtual receiving array constituted on the basis of an arrangement of the transmitting array antennas and the receiving array antennas, first maximum likelihood values corresponding to NW (where NW is an integer of 1 or larger) angles in the first direction and extracts first candidate angles of arrival of incoming waves in the first direction including at least the first maximum likelihood values, a second estimator that, by performing a maximum likelihood estimation process on a second direction that is orthogonal to the first direction, calculates, using signals received by a second virtual linear array constituted by virtual receiving antennas, linearly arranged in the second direction, that belong to the plurality of virtual receiving antennas, second maximum likelihood values corresponding to the NW angles in the second direction and extracts second candidate angles of arrival of incoming waves in the second direction including at least the second maximum likelihood values, and a third estimator that estimates, using the first and second candidate angles of arrival, angles of arrival of the NW incoming waves in a two-dimensional plane extending in the first and second directions.

An aspect of the present disclosure makes it possible to measure an angle with a high degree of accuracy while suppressing an increase in computational complexity.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 6 is a block diagram showing an internal configuration of a direction estimator according to the embodiment;

FIG. 12 is a block diagram showing an internal configuration of a direction estimator according to Variation 2 of the embodiment;

FIG. 13 is a block diagram showing an internal configuration of a direction estimator according to Variation 2 of the embodiment;

DETAILED DESCRIPTION

Further, as a radar apparatus, a configuration (sometimes referred to as "MIMO radar") has been proposed which includes a plurality of antennas (array antenna) at a transmitting branch as well as at a receiving branch and performs beam scanning by signal processing with the transmitting and receiving array antennas (see, for example, J. Li, P. Stoica, "MIMO Radar with Colocated Antennas," Signal Processing Magazine, IEEE Vol. 24, Issue: 5, pp. 106-114, 2007).

Further, in the MIMO radar, at most as many virtual receiving array antennas (hereinafter referred to as "virtual receiving array") as the product of the number of transmitting antenna elements and the number of receiving antenna elements are configured by devising an arrangement of antenna elements in the transmitting and receiving array antennas. This makes it possible, with a small number of elements, to bring about an effect of increasing an effective aperture length of the array antenna and improve angular resolution.

Performing a direction-of-arrival estimation process using signals received by such a virtual receiving array makes it possible to measure an angle with higher resolution.

Further, a MIMO radar is also applicable in a case where beam scanning is performed on a two-dimensional plane extending in vertical and horizontal directions as well as a case where vertical or horizontal one-dimensional scanning (angle measuring) is performed.

Figure 1A:
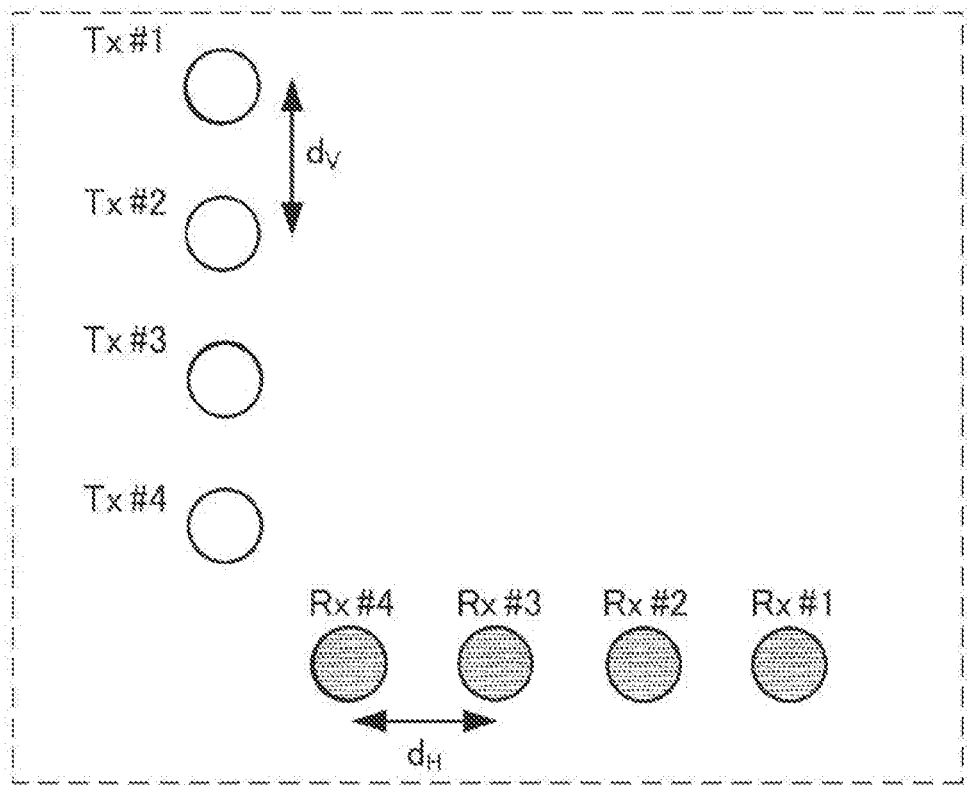
FIG. 1A is a diagram showing an example arrangement of transmitting and receiving antennas.

As an example, FIG. 1A shows a transmitting array antenna including four transmitting antennas (Tx #1 to Tx #4) arranged in a vertical direction and a receiving array antenna including four receiving antennas (Rx #1 to Rx #4) arranged in a horizontal direction. In FIG. 1A, the transmitting antennas are placed at regular spacings ($d_V$) in a vertical direction and the receiving antennas are placed at regular spacings ($d_H$) in a horizontal direction.

Figure 1B:
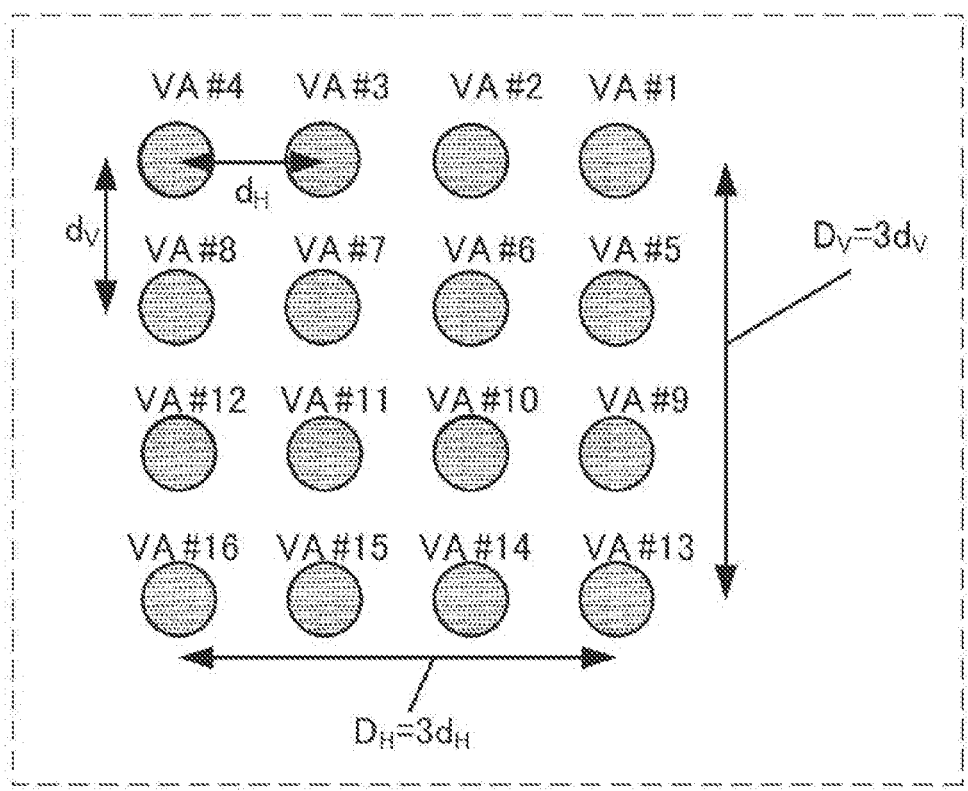
FIG. 1B is a diagram showing an example arrangement of a virtual receiving array.

FIG. 1B shows a virtual receiving array including transmitting and receiving array antennas of an antenna arrangement shown in FIG. 1A. The virtual receiving array shown in FIG. 1B is composed of sixteen virtual receiving antenna elements (VA #1 to VA #16), i.e. a four-by-four rectangular matrix of antennas arranged in vertical and horizontal directions. In FIG. 1B, the horizontal and vertical interelement spacings of the virtual receiving array are $d_H$ and $d_V$, respectively. That is, the horizontal and vertical aperture lengths $D_H$ and $D_V$ of the virtual receiving array are $3d_H$ and $3d_V$, respectively.

In a case where a direction-of-arrival estimation method involving the use of the maximum likelihood estimation method is applied to such a virtual receiving array, an incoming-wave angle at which an evaluation function reaches its minimum or maximum is searched for in search grids defined in vertical and horizontal directions. In so doing, making the search grids finer for a high-accuracy estimation of an angle of arrival causes an increase in computational complexity for searches.

As oppose to this method, there is known a method that utilizes local searches in estimating an angle of arrival with a high degree of accuracy (e.g. the Alternative Maximization technique described in Ilan Ziskind and Mati Wax, "Maximum Likelihood Localization of Multiple Sources by Alternating Projection," IEEE Trans. On Acoustics, Speech, and Signal Processing, Vol. 36, No. 10, October 1988). However, unless initial values are appropriately set, such a method may lapse into a local solution and greatly deteriorate in angle measurement accuracy.

Further, Ilan Ziskind and Mati Wax, "Maximum Likelihood Localization of Multiple Sources by Alternating Projection," IEEE Trans. On Acoustics, Speech, and Signal Processing, Vol. 36, No. 10, October 1988 discloses a method for reducing computational complexity by performing an initial search with search grids comparatively coarsely set within an angle-of-arrival range at which incoming waves are expected to arrive and making grids falling within a search range gradually finer while partially limiting the search range after the initial search.

For example, in a case where the angles of arrival of K incoming waves are estimated in two dimensions of a vertical direction (elevation) and a horizontal direction (azimuth) using the maximum likelihood estimation method, the number of searches $N_{search}$ is expressed as the following equation (1) in order to search in (NGV×NGH) two-dimensional grids for K different combinations. It should be noted that NGV denotes the number of vertical search grids and NGH denotes the number of horizontal search grids.

$$N_{search} = {}_{(NGV \times NGH)}C_K \qquad (1)$$

For example, assuming, in Eq. (1), that initial search grids are set so that the number of vertical search grids NGV is 10 and the number of horizontal search grids NGH is 10 and the number of incoming waves K is 2, it is necessary to perform 4950 (=100×99/2) searches.

Therefore, the method disclosed in Ilan Ziskind and Mati Wax, "Maximum Likelihood Localization of Multiple Sources by Alternating Projection," IEEE Trans. On Acoustics, Speech, and Signal Processing, Vol. 36, No. 10, October 1988 causes an increase in computational complexity for searches. Further, in Ilan Ziskind and Mati Wax, "Maximum Likelihood Localization of Multiple Sources by Alternating Projection," IEEE Trans. On Acoustics, Speech, and Signal Processing, Vol. 36, No. 10, October 1988, reducing the number of search grids in order to reduce computational complexity causes deterioration in angle measurement accuracy.

To address these problems, an aspect of the present disclosure describes a method for, in executing a direction-of-arrival estimation method using the maximum likelihood estimation method, reducing the number of searches (computational complexity) while maintaining angle measurement accuracy in an angle measurement process.

An embodiment of the present disclosure is described in detail below with reference to the drawings. It should be noted that, in the embodiment below, the same constituent elements are given the same reference numerals, and duplication of description is omitted.

The following describes, as a radar apparatus, a configuration in which a transmitting branch sends out different time-division multiplexed transmission signals through a plurality of transmitting antennas and a receiving branch demultiplexes each of the transmission signals and performs a receiving process. However, without being limited to this configuration, the radar apparatus may alternatively be configured such that the transmitting branch sends out different frequency-division multiplexed transmission signals through the plurality of transmitting antennas and the receiving branch demultiplexes each of the transmission signals and performs a receiving process. Similarly, the radar apparatus may alternatively be configured such that the transmitting branch sends out time-division multiplexed transmission signals through the plurality of transmitting antennas and the receiving branch performs a receiving process.

Configuration of Radar Apparatus

Figure 2:
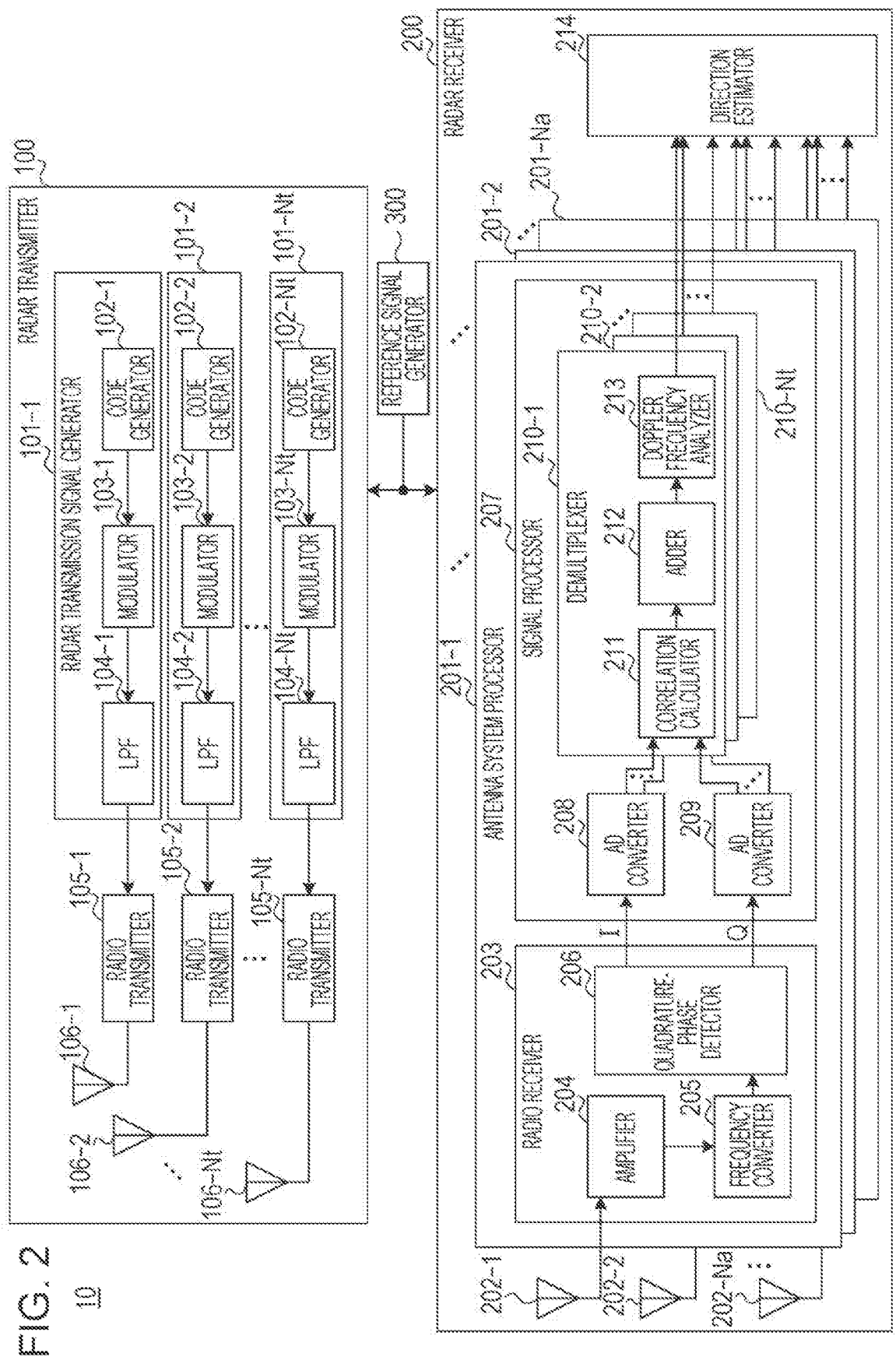
FIG. 2 is a block diagram showing a configuration of a radar apparatus according to an embodiment.

FIG. 2 is a block diagram showing a configuration of a radar apparatus 10 according to the present embodiment.

The radar apparatus 10 includes a radar transmitter (transmitting branch) 100, a radar receiver (receiving branch) 200, and a reference signal generator 300.

The radar transmitter 100 generates high-frequency (radio-frequency) radar signals (radar transmission signals) in accordance with reference signals received from the reference signal generator 300. Then, the radar transmitter 100 transmits the radar transmission signals with predetermined radar transmission periods through a transmitting array antenna including a plurality of transmitting antennas 106-1 to 106-Nt.

The radar receiver 200 receives, through a receiving array antenna including a plurality of receiving antennas 201-1 to 202-Na, reflected-wave signals produced by the radar transmission signals being reflected by a target (not illustrated). The radar receiver 200 performs synchronous processing with the radar transmitter 100 by performing the following processing operation with reference to the reference signals received from the reference signal generator 300. That is, the radar receiver 200 processes the reflected-wave signals received through each separate receiving antenna 202 and at least detects the presence or absence of a target and estimates the direction of the target. It should be noted that the target is an object to be detected by the radar apparatus 10 and examples of the target include vehicles (including four-wheel and two-wheel vehicles) or persons.

The reference signal generator 300 is connected to both the radar transmitter 100 and the radar receiver 200. The reference signal generator 300 supplies the reference signals to the radar transmitter 100 and the radar receiver 200 to synchronize processes in the radar transmitter 100 and the radar receiver 200.

Configuration of Radar Transmitter 100

The radar transmitter 100 includes radar transmission signal generators 101-1 to 101-Nt, radio transmitters 105-1 to 105-Nt, and the transmitting antennas 106-1 to 106-Nt. That is, the radar transmitter 100 has the Nt transmitting antennas 106, each of which is connected to a corresponding one of the radar transmission signal generators 101 and a corresponding one of the radio transmitters 105.

Each of the radar transmission signal generators 101 receives reference signals from the reference signal generator 300, generates timing clocks by multiplying the reference signals by a predetermined number, and generates radar transmission signals in accordance with the timing clocks thus generated. Then, the radar transmission signal generator 101 repeatedly outputs the radar transmission signals with predetermined radar transmission periods (Tr). A radar transmission signal is represented by $r_z(k, M) = I_z(k, M) + j Q_z(k, M)$. Note here that z denotes a number corresponding to each transmitting antenna 106 and z=1, . . . , Nt. Note also that j denotes the imaginary unit, k denotes discrete time, and M denotes the ordinal number of a radar transmission period.

Each of the radar transmission signal generators 101 includes a code generator 102, a modulator 103, and an LPF (low-pass filter) 104. The following describes each component of the radar transmission signal generator 101-z, which corresponds to the zth (where z=1, . . . , Nt) transmitting antenna 106.

Specifically, for each radar transmission period Tr, the code generator 102 generates a code $a(z)_n$ (n=1, . . . , L) (pulse code) of a code sequence of a code length L. Used as the codes $a(z)_n$ (z=1, . . . , Nt) generated by the respective code generators 102-1 to 102-Nt are codes that are lowly correlated or uncorrelated with one another. Examples of the code sequence include a Walsh-Hadamard code, an M sequence code, and a Gold code.

The modulator 103 performs pulse modulation (amplitude modulation, ASK (amplitude shift keying), pulse shift keying) or phase modulation (phase shift keying) on the code $a(z)_n$ received from the code generator 102 and outputs a modulated signal to the LPF 104.

The LPF 104 outputs a signal component of the modulated signal received from the modulator 103 which is below a predetermined limited bandwidth to the transmission switcher 106 as a baseband radar transmission signal.

The zth (where z=1, ..., Nt) radio transmitter 105 generates a radar transmission signal in a carrier-frequency (radio-frequency: RF) band by performing a frequency conversion on a baseband radar transmission signal outputted from the zth radar transmission signal generator 101, amplifies the radar transmission signal thus generated to a predetermined transmission power P [dB], and outputs the radar transmission signal thus amplified to the zth transmitting antenna 106.

The zth (where z=1, ..., Nt) transmitting antenna 106 emits, into a space, the radar transmission signal outputted from the zth radio transmitter 105.

Figure 3:
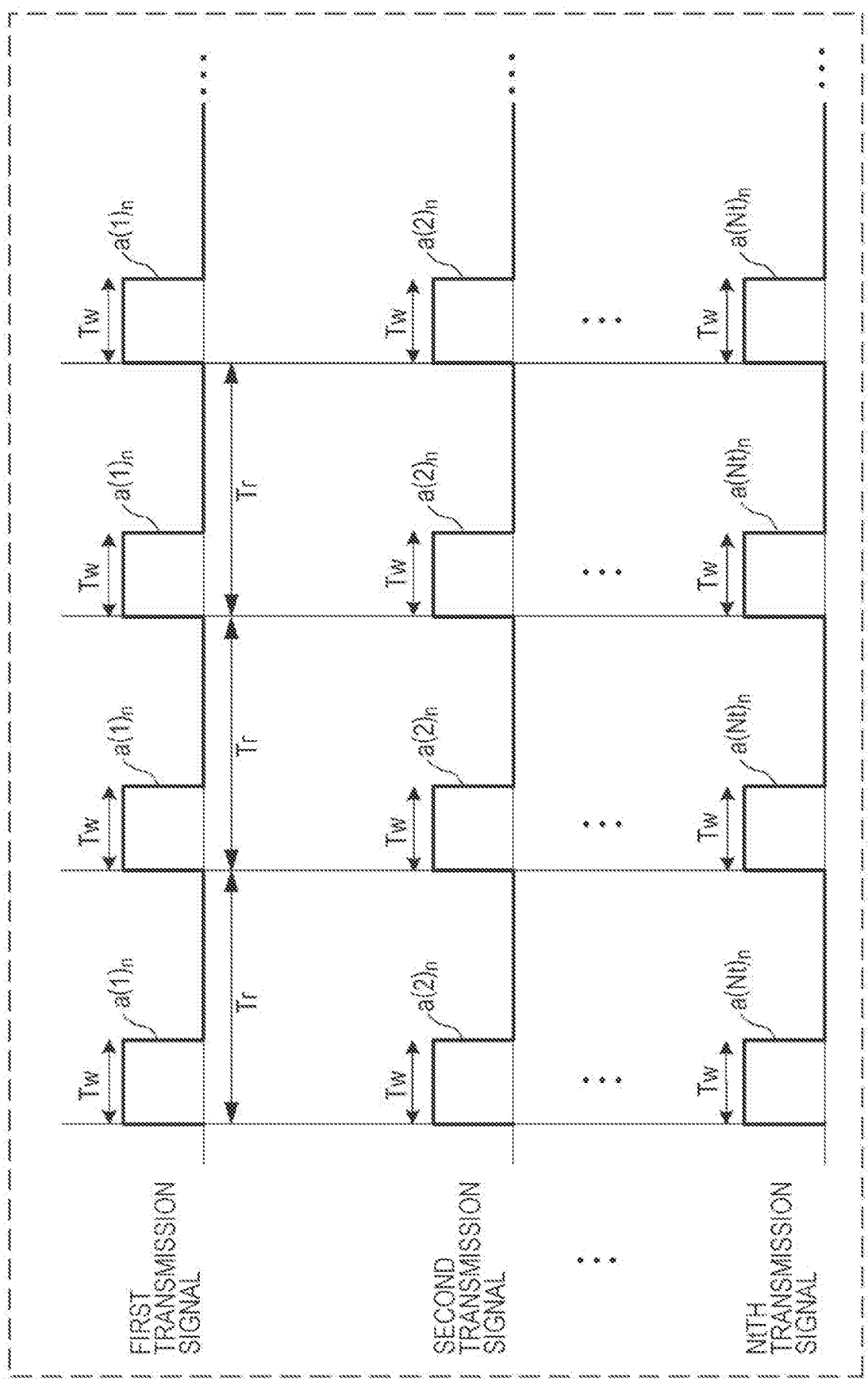
FIG. 3 is a diagram showing examples of radar transmission signals according to the embodiment.

FIG. 3 shows radar transmission signals that are transmitted from the Nt transmitting antennas 106 of the radar transmitter 100. A code transmission section Tw includes a pulse code sequence of a code length L. A pulse code sequence is transmitted during a code transmission section Tw of each radar transmission period Tr, and the remaining section (Tr–Tw) is a no-signal section. One pulse code $(a(z)_n)$ is subjected to pulse modulation with No samples, whereby each code transmission section Tw includes Nr (=No×L) samples. That is, the modulator 103 has a sampling rate of (No×L)/Tw. Further, the no-signal section (Tr–Tw) includes Nu samples.

Figure 4:
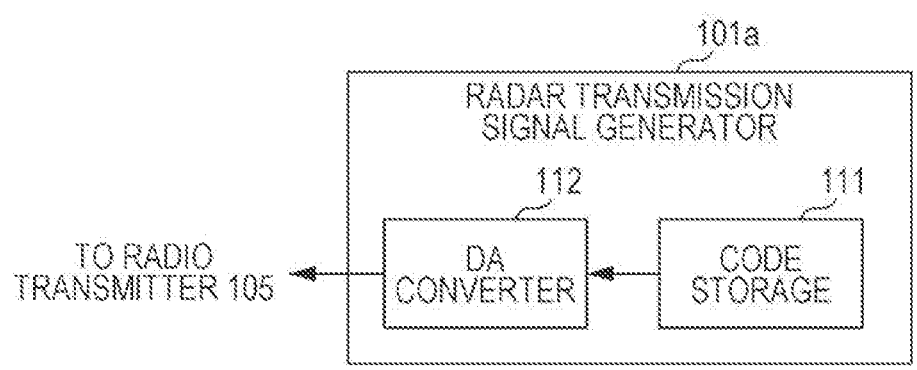
FIG. 4 is a block diagram showing another configuration of a radar transmission signal generator according to the embodiment.

It should be noted that the radar transmitter 100 may include a radar transmission signal generator 101a, which is shown in FIG. 4, instead of including the radar transmission signal generator 101. The radar transmission signal generator 101a includes a code storage 111 and a DA converter 112 instead of including the code generator 102, the modulator 103, or the LPF 104, which are shown in FIG. 2. The code storage 111 stores in advance code sequences generated by the code generator 102 (FIG. 4) and cyclically and sequentially reads out the code sequences thus stored. The DA converter 112 converts, into an analog signal, a code sequence (digital signal) outputted from the code storage 111.

Configuration of Radar Receiver 200

As shown in FIG. 2, the radar receiver 200 includes the Na receiving antennas 202, which constitute an array antenna. Further, the radar receiver 200 includes Na antenna system processors 201-1 to 201-Na and a direction estimator 214 (direction-of-arrival estimation device).

Each of the receiving antennas 202 receives a reflected-wave signal produced by a radar transmission signal being reflected by a target (object) and outputs the reflected-wave signal thus received to a corresponding one of the antenna system processors 201 as a received signal.

Each of the antenna system processors 201 includes a radio receiver 203 and a signal processor 207.

The radio receiver 203 includes an amplifier 204, a frequency converter 205, and a quadrature-phase detector 206. The radio receiver 203 receives reference signals from the reference signal generator 300, generates timing clocks by multiplying the reference signals by a predetermined number, and operates in accordance with the timing clocks thus generated. Specifically, the amplifier 204 amplifies a received signal received from the receiving antenna 202 to a predetermined level, the frequency converter 205 converts the frequency of the received signal from a high-frequency band into a baseband, and the quadrature-phase detector 206 converts the baseband received signal into a baseband received signal including an I signal and a Q signal.

The signal processor 207 includes AD converters 208 and 209 and demultiplexers 210-1 to 210-Nt.

The AD converter 208 receives the I signal from the quadrature-phase detector 206, and the AD converter 209 receives the Q signal from the quadrature-phase detector 206. The AD converter 208 takes discrete-time samples of the baseband signal including the I signal and thereby converts the I signal into digital data. The AD converter 209 takes discrete-time samples of the baseband signal including the Q signal and thereby converts the Q signal into digital data.

Note here that each of the AD converters 208 and 209 takes Ns discrete samples for the duration Tp (=Tw/L) of each subpulse of a radar transmission signal. That is, the oversampling number per subpulse is Ns.

In the following description, with use of an I signal Ir(k, M) and a Q signal Qr(k, M), a baseband received signal that is outputted from the AD converters 208 and 209 at discrete time k in the Mth radar transmission period Tr[M] is expressed as a complex signal x(k, M)=Ir(k, M)+j Qr(k, M). Further, in the following, discrete time k has its basis (k=1) at the timing of the start of a radar transmission period (Tr), and the signal processor 207 periodically operates until a sample point k=(Nr+Nu)Ns/No preceding the end of the radar transmission period Tr. That is, k=1, ..., (Nr+Nu) Ns/No. Note here that j is the imaginary unit.

The signal processor 207 includes the Nt demultiplexers 210. Nt is equal to the number of systems that corresponds to the number of transmitting antennas 106. Each of the demultiplexers 210 includes a correlation calculator 211, an adder 212, and a Doppler frequency analyzer 213. The following describes a configuration of the zth (where z=1, ..., Nt) demultiplexer 210.

For each radar transmission period Tr, the correlation calculator 211 performs a correlation calculation between a discrete sample value x(k, M) including the discrete sample values Ir(k, M) and Qr(k, M) received from the AD converters 208 and 209 and the pulse code $a(z)_n$ (where z=1, ..., Nt and n=1, ..., L) transmitted by the radar transmitter 100. For example, the correlation calculator 211 performs a sliding correlation calculation between the discrete sample value x(k, M) and the pulse code $a(z)_n$. For example, the correlation calculation value $AC_{(z)}(k, M)$ of a sliding correlation calculation at discrete time k in the Mth radar transmission period Tr[M] is calculated according to the following equation:

$$AC_{(z)}(k, M) = \sum_{n=1}^{L} x(k + N_s(n-1), M) a(z)_n^* \qquad (2)$$

where the asterisk (*) denotes a complex conjugate operator.

The correlation calculator 211 performs correlation calculations according to Eq. (2), for example, over the duration of k=1, ..., (Nr+Nu)Ns/No.

Figure 5:
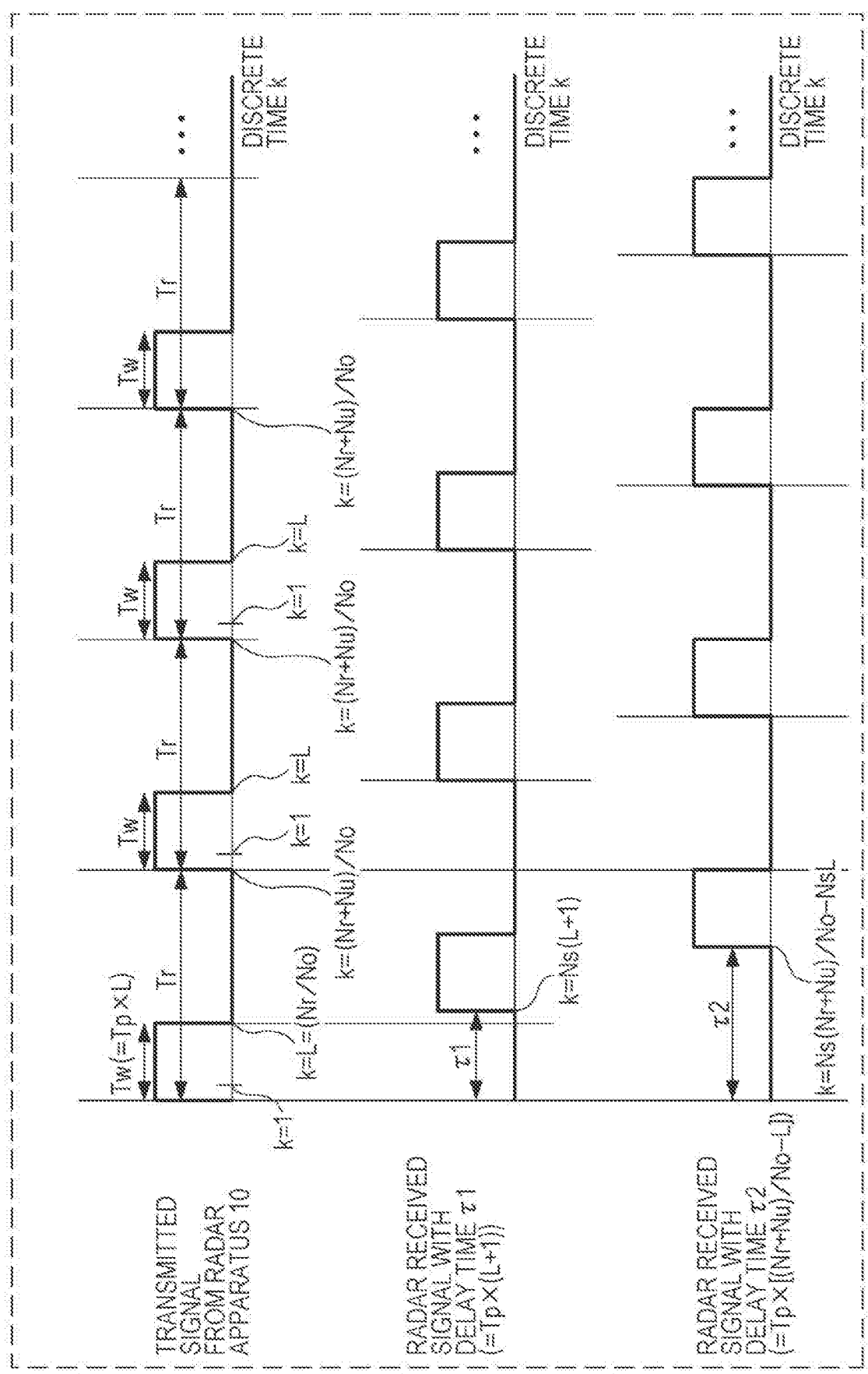
FIG. 5 is a diagram showing examples of timings of transmission of radar transmission signals and examples of measuring ranges according to the embodiment.

It should be noted that the correlation calculator 211 is not limited to the case of performing correlation calculations over the duration of k=1, ..., (Nr+Nu)Ns/No, but may limit a measuring range (i.e. the range of k) according to the range of presence of a target to be measured by the radar apparatus 10. This enables the radar apparatus 10 to reduce the amount of arithmetic processing that is performed by the correlation calculator 211. For example, the correlation calculator 211 may limit the measuring range to k=Ns(L+1), . . . , (Nr+Nu)Ns/No−NsL. In this case, as shown in FIG. 5, the radar apparatus 10 does not perform measurements in time sections corresponding to code transmission sections Tw.

With this, even in such a case where a radar transmission signal sneaks directly to the radar receiver 200, the radar apparatus 10 can perform measurements to the exclusion of the influence of sneaking, as the correlation calculator 211 does not execute processing during a period in which the radar transmission signal sneaks (i.e. a period of at least less than τ1). Further, in a case where the measuring range (range of k) is limited, the radar apparatus 10 may apply processing in a similarly limited measuring range (range of k) to processes in the adder 212, the Doppler frequency analyzer 213, and the direction estimator 214, which will be described below. This makes it possible to reduce the amount of processing in each component, allowing the radar receiver 200 to consume less electricity.

The adder 212 performs addition (coherent integration) of correlation calculation values $AC_{(z)}(k, M)$, which are received from the correlation calculator 211 for each discrete time k of the Mth radar transmission period Tr, over the duration (Tr×Np) of a predetermined number (Np) of radar transmission periods Tr. The addition (coherent integration) process over the duration (Tr×Np) is expressed by the following equation:

$$CI_{(z)}(k, M) = \sum_{g=1}^{N_p} AC_{(z)}(k, N_p(m-1)+g) \quad (3)$$

Note here that $CI_{(z)}(k, m)$ denotes the value of addition (hereinafter referred to as "correlation additional value") of correlation calculation values, Np is an integer of not less than 1, m is an integer of not less than 1 that indicates the ordinal number of the number of additions in a case where the number of additions Np that the adder 212 performs is a single unit. Further, z=1, . . . , Nt.

The adder 212 performs Np additions by using, as a single unit, an output from the correlation calculator 211 obtained with a radar transmission period Tr as a unit. That is, the adder 212 adds correlation calculation values $AC_{(z)}$ (k, Np(m−1)+1) to $AC_{(z)}$(k, Np×m) as a single unit at uniform timings of discrete time k and thereby calculates a correlation additional value $CI_{(z)}(k, m)$ every discrete time k. As a result, the effect of Np additions of correlation calculation values allows the adder 212 to improve the SNR of reflected-wave signals in a range where reflected-wave signals from a target have high correlation. This allows the radar receiver 200 to improve measurement performance regarding the estimation of the distance of arrival of the target.

It should be noted that, in order for an ideal gain of addition to be achieved, it is necessary that the phase components of correlation calculation values have a certain level of uniformity in as many sections of addition as the number of additions Np of correlation calculation values. That is, it is preferable that the number of additions Np be set according to an assumed maximum moving velocity of a target to be measured. A reason for this is that an increase in the assumed maximum velocity of the target leads to an increase in amount of variation in the Doppler frequencies of reflected waves from the target. For this reason, there is a reduction in duration of time for which the correlation is high. Therefore, the number of additions Np takes on a smaller value, with the result that the addition performed by the adders 212 brings about a smaller gain improvement effect.

The Doppler frequency analyzer 213 performs coherent integration at uniform timings of discrete time k with $CI_{(z)}(k, Nc(w-1)+1)$ to $CI_{(z)}(k, Nc\times w)$, which are Nc outputs from the adder 211 obtained for each discrete time k, as a unit. For example, the Doppler frequency analyzer 213 performs coherent integration after correcting a phase variation $\phi(fs)=2\pi fs(Tr\times Np)\Delta\Phi$ depending on 2Nf different Doppler frequencies fsΔφ according to the following equation:

$$FT\_CI_{(z)}^{Nant}(k, f_s, w) = \sum_{q=0}^{N_c-1} CI_{(z)}(k, N_c(w-1)+q+1)\exp[-j\phi(f_s)q] = \quad (4)$$

$$\sum_{q=0}^{N_c-1} CI_{(z)}(k, N_c(w-1)+q+1)\exp[-j2\pi f_s T_r N_p q \Delta\phi]$$

Note here that $FT\_CI_{(z)}^{Nant}(k, fs, w)$ is the wth output from the Doppler frequency analyzer 213 and represents a result of the coherent integration of Doppler frequencies fsΔφ at discrete time k in the Nantth antenna system processor 201. Note, however, that Nant=1 to Na, fs=−Nf+1, . . . 0, . . . , Nf, k=1, . . . (Nr+Nu)Ns/No, w is an integer of not less than 1, and Δφ is the phase rotation unit.

This allows each of the antenna system processors 201 to yield $FT\_CI_{(z)}^{Nant}(k, -Nf+1, w), \ldots, FT\_CI_{(z)}^{Nant}(k, Nf-1, w)$, which are results of coherent integration according to 2Nf Doppler frequency components for each discrete time k, for the duration (Tr×Np×Nc) of every Np×Nc radar transmission periods Tr. It should be noted that j is the imaginary unit and z=1, . . . , Nt.

In a case where Δφ=1/Nc, the aforementioned process in the Doppler frequency analyzer 213 is equivalent to performing a discrete Fourier transform (DFT) operation on outputs from the adder 212 at a sampling frequency fm=1/Tm at sampling intervals Tm=(Tr×Np).

Further, setting Nf to a power-of-two number allows the Doppler frequency analyzer 213 to apply a fast Fourier transform (FFT) operation and reduce the amount of arithmetic processing. It should be noted that when Nf>Nc, performing zero filling such that $CI_{(z)}(k, Nc(w-1)+q)=0$ in a region where q>Nc makes it possible to similarly apply an FFT operation and reduce the amount of arithmetic processing.

Alternatively, instead of performing an FFT operation, the Doppler frequency analyzer 213 may perform a process of serially performing product-sum operations according to Eq. (4) above. That is, in response to $CI_{(z)}(k, Nc(w-1)+q+1)$, which are Nc outputs from the adder 212 obtained for each discrete time k, the Doppler frequency analyzer 213 may generate a coefficient $\exp[-j2\pi f_s T_r N_p q \Delta\varphi]$ corresponding to fs=−Nf+1, . . . , 0, Nf−1 and serially perform product-sum operations. Note here that q=0 to Nc−1.

It should be noted that, in the following description, the wth outputs $FT\_CI_{(z)}^1(k, fs, w), FT\_CI_{(z)}^2(k, fs, w), \ldots, FT\_CI_{(z)}^{Na}(k, fs, w)$ obtained by performing the same processes in the Na antenna system processors 201 are denoted as a virtual receiving array correlation vector h(k, fs, w) in the following equations. The virtual receiving array correlation vector h(k, fs, w) includes as many elements as Nt×Na, which is the product of the number of transmitting antennas Nt and the number of receiving antennas Na. The virtual receiving array correlation vector h(k, fs, w) is used in the following description of a process of making a direction estimate based on a phase difference between receiving antennas 202 in response to reflected-wave signals from a target. Note here that z=1, . . . , Nt and b=1, Na.

$$h(k, fs, w) = \begin{bmatrix} FT\_CI^1_{(1)}(k, fs, w) \\ FT\_CI^1_{(2)}(k, fs, w) \\ \vdots \\ FT\_CI^1_{(Nt)}(k, fs, w) \\ FT\_CI^2_{(1)}(k, fs, w) \\ FT\_CI^2_{(2)}(k, fs, w) \\ \vdots \\ FT\_CI^2_{(Nt)}(k, fs, w) \\ \vdots \\ FT\_CI^{Na}_{(1)}(k, fs, w) \\ FT\_CI^{Na}_{(2)}(k, fs, w) \\ \vdots \\ FT\_CI^{Na}_{(Nt)}(k, fs, w) \end{bmatrix} = \begin{bmatrix} h^1(k, fs, w) \\ h^2(k, fs, w) \\ \vdots \\ h^{Na}(k, fs, w) \end{bmatrix} \quad (5)$$

$$h^b(k, fs, w) = \begin{bmatrix} FT\_CI^b_{(1)}(k, fs, w) \\ FT\_CI^b_{(2)}(k, fs, w) \\ \vdots \\ FT\_CI^b_{(Nt)}(k, fs, w) \end{bmatrix} \quad (6)$$

The foregoing has described processes in the components of the signal processor 207.

The direction estimator 214 calculates a virtual receiving array correlation vector $h\_after\_cal$(k, fs, w) with corrections made for a phase deviation and an amplitude deviation between antenna system processors 201 by multiplying, by an array correction value $h\_cal_{[y]}$ that corrects phase deviations and amplitude deviations between transmitting array antennas and between receiving array antennas, the virtual receiving array correlation vector h(k, fs, w) of the wth Doppler frequency analyzer 213 outputted from the antenna system processors 201-1 to 201-Na. The virtual receiving array correlation vector $h\_after\_cal$(k, fs, w) is expressed by the following equation. It should be noted that y=1, (Nt×Na).

$$h\_after\_cal(k, fs, w) = C_a h(k, fs, w) = \begin{bmatrix} h_1(k, fs, w) \\ h_2(k, fs, w) \\ \vdots \\ h_{Nt \times Na}(k, fs, w) \end{bmatrix} \quad (7)$$

$$C_a = \begin{bmatrix} h\_cal_{[1]} & 0 & \cdots & 0 \\ 0 & h\_cal_{[2]} & \ddots & \vdots \\ \vdots & \ddots & \ddots & 0 \\ 0 & \cdots & 0 & h\_cal_{[Nt \times Na]} \end{bmatrix}$$

The virtual receiving array correlation vector $h\_after\_cal$(k, fs, w) with corrections made for the inter-antenna deviations is a column vector composed of Na×Nt elements. In the following, the elements of the virtual receiving array correlation vector $h\_after\_cal$(k, fs, w) are denoted as $h_1$(k, fs, w), . . . , $h_{Nt \times Na}$(k, fs, w) for use in the description of the direction estimation process.

The direction estimator 214 performs horizontal and vertical direction-of-arrival estimation processes on the basis of a phase difference in incoming reflected wave between receiving antennas.

Direction-of-Arrival Estimation Method that is Executed by Radar Apparatus 10

The following describes the details of a direction-of-arrival estimation method that is executed by the radar apparatus 10 thus configured.

FIG. 6 is a block diagram showing an example internal configuration of the direction estimator 214 (direction-of-arrival estimation device) of the radar apparatus 100 shown in FIG. 2.

The following description assumes that the number of incoming waves (hereinafter represented as "NW") arriving at the radar apparatus 10 is 2. That is, the direction estimator 214 estimates the angles of arrival of the two waves in a horizontal and vertical two-dimensional plane. The number of incoming waves NW is not limited to 2 but may be 1 or not smaller than 3.

The direction estimator 214 shown in FIG. 6 includes an inter-antenna deviation corrector 241, a horizontal array maximum likelihood estimator 242, a vertical array maximum likelihood estimator 243, and a horizontal/vertical maximum likelihood estimator 244.

As mentioned above, the inter-antenna deviation corrector 241 corrects a phase deviation and an amplitude deviation between antenna system processors 201 by multiplying, by the array correction value $h\_cal_{[y]}$, the virtual receiving array correlation vector h(k, fs, w) of the Doppler frequency analyzer 213 outputted from the antenna system processors 201-1 to 201-Na (see, for example, Eq. (7)).

Operation of Horizontal Array Maximum Likelihood Estimator 242

The horizontal array maximum likelihood estimator 242 performs the following process on the basis of the virtual receiving array correlation vector $h\_after\_cal$(k, fs, w) with corrections made for the inter-antenna deviations, which is inputted from the inter-antenna deviation corrector 241.

Specifically, first, the horizontal array maximum likelihood estimator 242 extracts, from elements, included in the virtual receiving array correlation vector $h\_after\_cal$(k, fs, w) with corrections made for the inter-antenna deviations, that correspond to the virtual receiving antennas VA #1, . . . , VA #(Nt×Na), respectively, a horizontal array correlation vector $h_{SubH}$(k, fs, w) composed of elements of a virtual horizontal linear array constituting a linear array of three or more antennas in a horizontal direction on the virtual receiving array. The following assumes that "$N_{VAH}$" (which is a value of not smaller than 3 here) is the number of elements that constitute each virtual horizontal linear array (i.e. the number of virtual receiving antennas).

Then, the horizontal array maximum likelihood estimator 242 performs a maximum likelihood estimation process on the horizontal direction using the horizontal array correlation vector $h_{SubH}$(k, fs, w) thus extracted. In the horizontal maximum likelihood estimation process, the horizontal array maximum likelihood estimator 242 calculates, in a predetermined horizontal search grid, an angle (maximum likelihood value) at which a predetermined evaluation function $E_{SubH}(\theta^{(1)}, \theta^{(2)}, \ldots \theta^{(NW)})$ based on the principles of maximum likelihood estimation reaches its minimum or maximum. Note here that NW denotes the number of incoming waves.

The number of incoming waves NW may be a prefixed number of waves or may be adaptively varied using the virtual receiving array correction vector $h\_after\_cal(k, fs, w)$. An estimation of the number of incoming waves may involve the use of MDL (minimum description length), AIC (Akaike's information criterion), or the like.

Further, the number of antennas that constitute a virtual horizontal linear array on the virtual receiving array is not limited to 3, and a virtual horizontal linear array needs only be constituted by at least (NW+1) virtual receiving antennas according to the number of incoming waves NW.

Further, in a case where there exist a plurality of virtual horizontal linear arrays constituting linear arrays of three or more antennas in a horizontal direction on the virtual receiving array, the horizontal array maximum likelihood estimator 242 calculates, using a plurality of horizontal array correlation vectors $\{h_{SubH(1)}(k, fs, w), h_{SubH(2)}(k, fs, w), \ldots, h_{SubH(NsubH)}(k, fs, w)\}$ composed of elements included in the respective virtual horizontal linear arrays, angles (maximum likelihood values) at which the predetermined evaluation function $E_{SubH}(\theta^{(1)}, \theta^{(2)}, \ldots, \theta^{(NW)})$ based on the principles of maximum likelihood estimation reaches its minimum or maximum. Note here that "$N_{SubH}$" is the number of virtual horizontal linear arrays of three of more antennas in a horizontal direction on the virtual receiving array (i.e. the number of horizontal array correlation vectors).

Further, usable examples of the predetermined evaluation function $E_{SubH}(\theta^{(1)}, \theta^{(2)}, \ldots, \theta^{(NW)})$ based on the principles of maximum likelihood estimation include the following equations (8), (9), and (10):

$$E_{SubH}(\theta^{(1)}, \ldots, \theta^{(NW)}) = \sum_{ns=1}^{N_{SubH}} \|h_{SubH(ns)}(k, f_s, w) - A_{SubH(ns)} S_{SubH(ns)}\|^2 \quad (8)$$

$$A_{SubH(ns)} = [a_{SubH(ns)}(\theta^{(1)}, \alpha_{SH}), \ldots, a_{SubH(ns)}(\theta^{(NW)}, \alpha_{SH})] \quad (9)$$

$$S_{SubH(ns)} = (A_{SubH(ns)}^H A_{SubH(ns)})^{-1} A_{SubH(ns)}^H h_{SubH(ns)}(k, f_s, w) \quad (10)$$

Note here that $a_{SubH}(\theta_u, \alpha_{SH})$ denotes a horizontal array directional vector and is a directional vector obtained by extracting, from the directional vector $a(\theta_u, \phi_v)$ of the virtual receiving array, components corresponding to the elements of the virtual horizontal linear arrays among the elements VA #1, . . . , VA #(NtxNa) included in the virtual receiving array correlation vector $h\_after\_cal(k, fs, w)$. It should be noted that $\alpha_{SH}$ is a fixed direction and may for example be a 0-degree direction or another direction.

In Eq. (8), angles $(\theta^{(1)}, \theta^{(2)}, \ldots, \theta^{(NW)})$ that minimize the evaluation function $E_{SubH}(\theta^{(1)}, \theta^{(2)}, \ldots, \theta^{(NW)})$ are maximum likelihood values. The horizontal array maximum likelihood estimator 242 outputs, to the horizontal/vertical maximum likelihood estimator 244, angles $(\theta_{ML}^{(1)}, \theta_{ML}^{(2)}, \theta_{ML}^{(NW)})$ serving as maximum likelihood values in the horizontal search grids.

As indicated by Eq. (8), the horizontal array maximum likelihood estimator 242 can calculate maximum likelihood values with improved reception quality (e.g. SNR) by using signals (horizontal array correlation vectors $h_{SubH}(k, fs, w)$) received by a plurality of ($N_{SubH}$) virtual horizontal linear arrays. In a case where the reception quality of the radar apparatus 10 is sufficiently satisfactory, the horizontal array maximum likelihood estimator 242 may calculate a maximum likelihood value using a signal received by a predetermined number of virtual horizontal linear arrays (at least one) of the plurality of virtual horizontal linear arrays. This makes it possible to reduce computational complexity while maintaining reception quality.

Further, the directional vector $a(\theta_u, \phi_v)$ is the (NtxNa)th column vector whose element is a complex response from virtual receiving array antennas in the case of arrival of radar reflected waves from an azimuth direction θ and an elevation direction φ. The complex response $a(\theta_u, \phi_v)$ from the virtual receiving array antennas represents phase differences that are geometrical-optically calculated at interelement spacings between the antennas.

That is, the complex response $a(\theta_u, \phi_v)$ from the virtual receiving array antennas is a value that is uniquely calculated if a virtual receiving array arrangement in the radar apparatus 10 is determined. Therefore, the horizontal array maximum likelihood estimator 242 may calculate the directional vector $a(\theta_u, \phi_v)$ in advance on the basis of the virtual receiving array arrangement VA #1, . . . , VA #(NtxNa) and store it.

Alternatively, the horizontal array maximum likelihood estimator 242 may store, as the directional vector $a(\theta_u, \phi_v)$, a value obtained by measuring the complex response from the virtual receiving array antennas in the case of arrival of radar reflected waves from the azimuth direction θ and the elevation direction φ. In this case, since the directional vector $a(\theta_u, \phi_v)$ also includes a deviation that depends on a direction between array antennas, the direction estimator 214 can also simultaneously correct a deviation from a phase that is ideally geometrical-optically calculated, enabling a more high-accuracy angle measurement process.

Further, of parameters that are used for the evaluation function, $(A_{SubH(ns)}^H A_{SubH(ns)})^{-1} A_{SubH(ns)}^H$ included in Eq. (10), which is a parameter pertaining to the directional vector $a(\theta_u, \phi_v)$, is a value that is determined depending on the virtual receiving array arrangement and is a fixed value for each angle. The horizontal array maximum likelihood estimator 242 may calculate $(A_{SubH(ns)}^H A_{SubH(ns)})^{-1} A_{SubH(ns)}^H$ for each angle in the horizontal search grids. Alternatively, the horizontal array maximum likelihood estimator 242 may use a configuration in which results of the calculation of $(A_{SubH(ns)}^H A_{SubH(ns)})^{-1} A_{SubH(ns)}^H$ are stored in advance in the form of a table and read out for each separate angle. This eliminates the need for a part of the arithmetic processing indicated by Eq. (10), making it possible to reduce computational complexity. Further, in the case of the use of the configuration in which readouts are given for each separate angle, it is possible to reduce arithmetic circuits such as multipliers or adders, although there is a need for a memory circuit for storing $(A_{SubH(ns)}^H A_{SubH(ns)})^{-1} A_{SubH(ns)}^H$.

Further, $\theta_u$ is a vector varied at horizontal (or azimuth) intervals $\beta_1$ within a predetermined horizontal (or azimuth) range in which an angle-of-arrival estimation is made. For example, $\theta_u$ is set as follows:

$\theta_u = \theta\min + u\beta_1$, u=0, . . . , NU

NU=floor[(θmax−θmin)/β₁]+1 where floor(x) is a function that returns a maximum integer value that does not exceed a real number x.

Further, $\phi_v$ is a vector varied at predetermined vertical (or elevation) intervals $\beta_2$ within a vertical (or elevation) range in which an angle-of-arrival estimation is made. For example, $\phi_v$ is set as follows:

$\phi_v = \phi\min + v\beta_2$, $v=0, \ldots, NV$ $NV = \text{floor}[(\phi\max - \phi\min)/\beta_2] + 1$ Accordingly, the horizontal array maximum likelihood estimator 242 searches for each of $\theta^{(1)}, \theta^{(2)}, \ldots, \theta^{(NW)}$ in search grids composed of horizontal (or azimuth) intervals $\beta_1$ within the range from the minimum azimuth $\theta\min$ to the maximum azimuth $\theta\max$.

Another usable example of the predetermined evaluation function $E_{SubH}(\theta^{(1)}, \theta^{(2)}, \ldots, \theta(NW))$ based on the principles of maximum likelihood estimation is the following equation (11). In Eq. (11), angles that maximize the evaluation function $E_{SubH}(\theta^{(1)}, \theta^{(2)}, \ldots, \theta(NW))$ are maximum likelihood values. The horizontal array maximum likelihood estimator 242 outputs angles $(\theta_{ML}^{(1)}, \theta_{ML}^{(2)}, \ldots, \theta_{ML}^{(NW)})$ serving as maximum likelihood values in the horizontal search grids.

$$E_{SubH}(\theta^{(1)}, \ldots, \theta^{(NW)}) = \sum_{ns=1}^{N_{SubH}} \|A_{SubH(ns)} S_{SubH(ns)}\|^2 \quad (11)$$

Figure 7A:
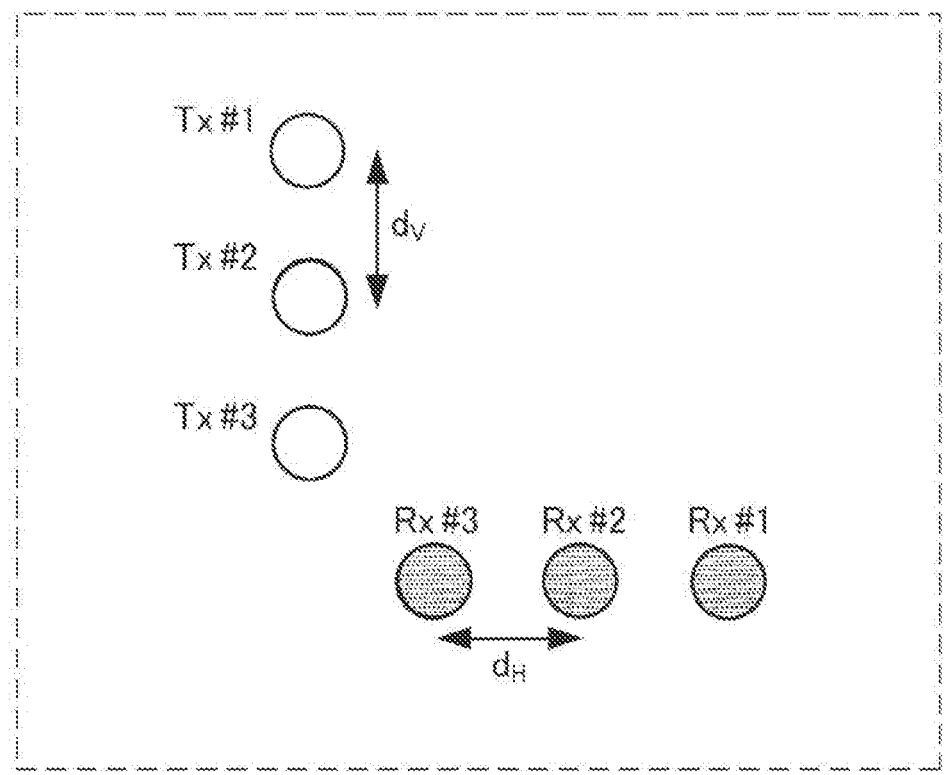
FIG. 7A is a diagram showing an example arrangement of transmitting and receiving antennas according to the embodiment.

The following describes, as an example, operation of the horizontal array maximum likelihood estimator 242 in an example arrangement of transmitting antennas 106 and receiving antennas 202 shown in FIG. 7A.

FIG. 7A assumes that the number Nt of transmitting antennas 106 is 3 and the number Na of receiving antennas 202 is 4. Further, the three transmitting antennas 106 are denoted by Tx #1 to Tx #3, and the three receiving antennas 202 are denoted by Rx #1 to Rx #4. Further, FIG. 7B shows an arrangement of a virtual receiving array that is obtained by the antenna arrangement shown in FIG. 7A.

Figure 7B:
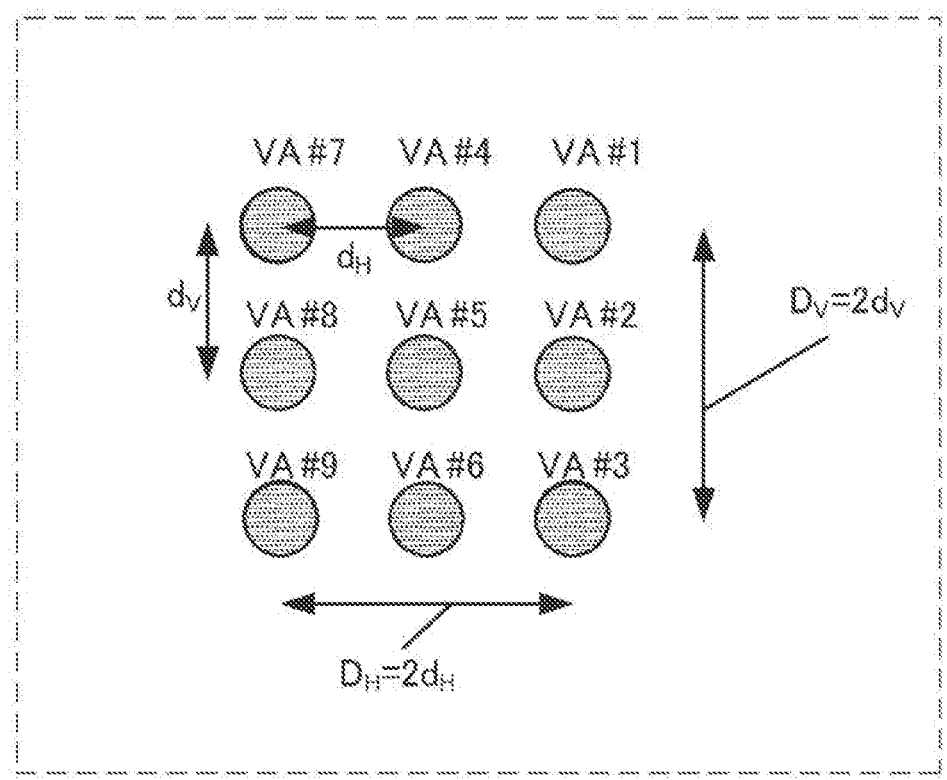
FIG. 7B is a diagram showing an example arrangement of a virtual receiving array according to the embodiment.

In the virtual receiving array shown in FIG. 7B, the horizontal and vertical aperture lengths $D_H$ and $D_V$ of the antennas are expressed as $D_H = 2d_H$ and $D_V = 2d_V$, respectively. It should be noted that $d_H$ denotes horizontal interelement spacings and $d_V$ denotes vertical interelement spacings.

The virtual receiving array shown in FIG. 7B has three (i.e. $N_{SubH} = 3$) virtual horizontal linear arrays of $N_{VAH} = 3$ and gives horizontal array correlation vectors $\{h_{SubH(1)}(k, fs, w), h_{SubH(2)}(k, fs, w), h_{SubH(3)}(k, fs, w)\}$ corresponding to the respective virtual horizontal linear arrays. Specifically, in FIG. 7B, the element numbers of the virtual receiving array correlation vectors $h_{\_after\_cal}(k, fs, w)$ included in the horizontal array correlation vectors $\{h_{SubH(1)}(k, fs, w), h_{SubH(2)}(k, fs, w), h_{SubH(3)}(k, fs, w)\}$ are $\{VA \#1, VA \#4, VA \#7\}$, $\{VA \#2, VA \#5, VA \#8\}$, and $\{VA \#3, VA \#6, VA \#9\}$, respectively.

The horizontal array directional vectors $\{a_{SubH(1)}(\theta_u, \alpha), a_{SubH(2)}(\theta_u, \alpha), a_{SubH(3)}(\theta_u, \alpha)\}$ corresponding to the horizontal array correlation vectors $\{h_{SubH(1)}(k, fs, w), h_{SubH(2)}(k, fs, w), h_{SubH(3)}(k, fs, w)\}$ are column vectors that are constituted by extracting the element numbers $\{VA \#1, VA \#4, VA \#7\}$, $\{VA \#2, VA \#5, VA \#8\}$, and $\{VA \#3, VA \#6, VA \#9\}$ of the directional vectors $a(\theta_u, \phi_v)$ of the virtual receiving array, respectively.

The horizontal array maximum likelihood estimator 242 extracts, using the horizontal array correlation vectors $\{h_{SubH(1)}(k, fs, w), h_{SubH(2)}(k, fs, w), h_{SubH(3)}(k, fs, w)\}$, angles $(\theta_{ML}^{(1)}, \theta_{ML}^{(2)})$ (i.e. NW=2 horizontal angle-of-arrival candidates) at which the evaluation function $E_{SubH}$ (e.g. Eq. (8) or (11)) reaches its minimum or maximum.

In this way, by performing a maximum likelihood estimation process on a horizontal direction, the horizontal array maximum likelihood estimator 242 extracts, using signals (virtual receiving array correlation vectors) received by a virtual horizontal linear array constituted by virtual receiving antennas, linearly arranged in the horizontal direction, that belong to a plurality of virtual receiving antennas (in FIG. 7B, VA #1 to VA #9) included in a virtual receiving array constituted on the basis of an arrangement of transmitting array antennas (transmitting antennas 106) and receiving array antennas (receiving antennas 202), maximum likelihood values $(\theta_{ML}^{(1)}, \theta_{ML}^{(2)})$ corresponding to NW (where NW=2) angles in the horizontal direction.

Operation of Vertical Array Maximum Likelihood Estimator 243

The vertical array maximum likelihood estimator 243 performs the following process on the basis of the virtual receiving array correlation vector $h_{\_after\_cal}(k, fs, w)$ with corrections made for the inter-antenna deviations, which is inputted from the inter-antenna deviation corrector 241.

Specifically, first, the vertical array maximum likelihood estimator 243 extracts, from elements, included in the virtual receiving array correlation vector $h_{\_after\_cal}(k, fs, w)$ with corrections made for the inter-antenna deviations, that correspond to the virtual receiving antennas VA #1, . . . , VA #(Nt×Na), respectively, a vertical array correlation vector $h_{SubV}(k, fs, w)$ composed of elements of a virtual vertical linear array constituting a linear array of three or more antennas in a vertical direction on the virtual receiving array. The following assumes that "$N_{VAV}$" (which is a value of not smaller than 3 here) is the number of elements that constitute each virtual vertical linear array (i.e. the number of virtual receiving antennas).

Then, the vertical array maximum likelihood estimator 243 performs a maximum likelihood estimation process on the vertical direction using the vertical array correlation vector $h_{SubV}(k, fs, w)$ thus extracted, which is composed of the elements of the virtual vertical linear array. In the vertical maximum likelihood estimation process, the vertical array maximum likelihood estimator 243 calculates, in a predetermined vertical search grid, an angle (maximum likelihood value) at which a predetermined evaluation function $E_{SubV}(\phi^{(1)}, \ldots, \phi^{(2)}, \ldots, \phi^{(NW)})$ based on the principles of maximum likelihood estimation reaches its minimum or maximum. Note here that NW denotes the number of incoming waves.

Further, the number of antennas that constitute a virtual horizontal linear array on the virtual receiving array is not limited to 3, and a virtual horizontal linear array needs only be constituted by at least (NW+1) virtual receiving antennas according to the number of incoming waves NW.

Further, in a case where there exist a plurality of virtual vertical linear arrays constituting linear arrays of three or more antennas in a vertical direction on a virtual receiving array, the vertical array maximum likelihood estimator 243 calculates, using a plurality of vertical array correlation vectors $\{h_{SubV(1)}(k, fs, w), h_{SubV(2)}(k, fs, w), \ldots, h_{SubV(NsubV)}(k, fs, w)\}$ composed of elements included in the respective virtual vertical linear arrays, angles (maximum likelihood values) at which the predetermined evaluation function $E_{SubV}(\phi^{(1)}, \phi^{(2)}, \ldots, \phi^{(NW)})$ based on the principles of maximum likelihood estimation reaches its minimum or maximum. Note here that "$N_{SubV}$" is the number of virtual vertical linear arrays of three of more antennas in a vertical direction on the virtual receiving array (i.e. the number of vertical array correlation vectors).

Further, usable examples of the predetermined evaluation function $E_{SubV}(\phi^{(1)}, \phi^{(2)}, \ldots, \phi^{(NW)})$ based on the principles of maximum likelihood estimation include the following equations (12), (13), and (14):

$$E_{SubV}(\phi^{(1)}, \ldots, \phi^{(NW)}) = \sum_{ns=1}^{N_{subV}} \|h_{SubV(ns)}(k, f_s, w) - A_{SubV(ns)} S_{SubV(ns)}\|^2 \quad (12)$$

$$A_{SubV(ns)} = [a_{SubV(ns)}(\alpha_{SV}, \phi^{(1)}), \ldots, a_{SubV(ns)}(\alpha_{SV}, \phi^{(NW)})] \quad (13)$$

$$S_{SubV(ns)} = (A_{SubV(ns)}^H A_{SubV(ns)})^{-1} A_{SubV(ns)}^H h_{SubV(ns)}(k, f_s, w) \quad (14)$$

Note here that $a_{SubV}(\alpha_{SV}, \phi_v)$ denotes a vertical array directional vector and is a directional vector obtained by extracting, from the directional vector $a(\theta_u, \phi_v)$ of the virtual receiving array, components corresponding to the elements of the virtual vertical linear arrays among the elements VA #1, ..., VA #(Nt×Na) included in the virtual receiving array correlation vector $h_{\_after\_cal}(k, fs, w)$. It should be noted that $\alpha_{sv}$ is a fixed direction and may be for example by a 0-degree direction or another direction.

In Eq. (12), angles $(\phi^{(1)}, \phi^{(2)}, \ldots, \phi^{(NW)})$ that minimize the evaluation function $E_{SubV}(\phi^{(1)}, \phi^{(2)}, \ldots, \phi^{(NW)})$ are maximum likelihood values.

The vertical array maximum likelihood estimator 243 searches for each of $(\phi^{(1)}, \phi^{(2)}, \ldots, \phi^{(NW)})$ in search grids composed of vertical (or elevation) intervals $\beta_2$ within the range from the minimum azimuth $\phi$min to the maximum azimuth $\phi$max. Then, the vertical array maximum likelihood estimator 243 outputs the angles $(\phi^{(1)}, \phi^{(2)}, \ldots, \phi^{(NW)})$ which serve as maximum likelihood values in the vertical search grids, to the horizontal/vertical maximum likelihood estimator 244.

Further, as indicated by Eq. (12), the vertical array maximum likelihood estimator 243 can calculate maximum likelihood values with improved reception quality (e.g. SNR) by using signals (vertical array correlation vectors $h_{SubV}(k, fs, w)$) received by a plurality of ($N_{SubV}$) virtual vertical linear arrays. In a case where the reception quality of the radar apparatus 10 is sufficiently satisfactory, the vertical array maximum likelihood estimator 243 may calculate a maximum likelihood value using a signal received by a predetermined number of virtual vertical linear arrays (at least one) of the plurality of virtual vertical linear arrays. This makes it possible to reduce computational complexity while maintaining reception quality.

Further, of parameters that are used for the evaluation function, $(A_{SubV(ns)}^H A_{SubV(ns)})^{-1} A_{SubV(ns)}^H$ included in Eq. (14), which is a parameter pertaining to the directional vector $a(\theta_u, \phi_v)$, is a value that is determined depending on the virtual receiving array arrangement and is a fixed value for each angle. The vertical array maximum likelihood estimator 243 may calculate $(A_{SubV(ns)}^H A_{SubV(ns)})^{-1} A_{SubV(ns)}^H$ for each angle in the horizontal search grids. Alternatively, the vertical array maximum likelihood estimator 243 may use a configuration in which results of the calculation of $(A_{SubH(ns)}^H A_{SubH(ns)})^{-1} A_{SubH(ns)}^H$ are stored in advance in the form of a table and read out for each separate angle. This eliminates the need for a part of the arithmetic processing indicated by Eq. (14), making it possible to reduce computational complexity. Further, in the case of the use of the configuration in which readouts are given for each separate angle, it is possible to reduce arithmetic circuits such as multipliers or adders, although there is a need for a memory circuit for storing $(A_{SubH(ns)}^H A_{SubH(ns)})^{-1} A_{SubH(ns)}^H$.

Another usable example of the predetermined evaluation function $E_{SubV}(\phi^{(1)}, \phi^{(2)}, \ldots, \phi^{(NW)})$ based on the principles of maximum likelihood estimation may be the following equation (15). In Eq. (15), angles that maximize the evaluation function $E_{SubV}(\phi^{(1)}, \phi^{(2)}, \ldots, \phi^{(NW)})$ are maximum likelihood values. The vertical array maximum likelihood estimator 243 outputs angles $(\phi_{ML}^{(1)}, \phi_{ML}^{(2)}, \ldots, \phi_{ML}^{(NW)})$ serving as maximum likelihood values in the vertical search grids.

$$E_{SubV}(\phi^{(1)}, \ldots, \phi^{(NW)}) = \sum_{ns=1}^{N_{subV}} \|A_{SubV(ns)} S_{SubV(ns)}\|^2 \quad (15)$$

The following describes, as an example, operation of the vertical array maximum likelihood estimator 243 in an example arrangement of transmitting antennas 106 and receiving antennas 202 shown in FIGS. 7A and 7B.

The virtual receiving array shown in FIG. 7B has three virtual vertical linear arrays of $N_{VAV}=3$ and gives vertical array correlation vectors $\{h_{SubV(1)}(k, fs, w), h_{SubV(2)}(k, fs, w), h_{SubV(3)}(k, fs, w)\}$ corresponding to the virtual vertical linear arrays, respectively. Specifically, in FIG. 7B, the element numbers of the virtual receiving array correlation vectors $h_{\_after\_cal}(k, fs, w)$ included in the vertical array correlation vectors $\{h_{SubV(1)}(k, fs, w), h_{SubV(2)}(k, fs, w), h_{SubV(3)}(k, fs, w)\}$ are $\{VA \#1, VA \#3, VA \#3\}$, $\{VA \#4, VA \#5, VA \#6\}$, and $\{VA \#7, VA \#8, VA \#9\}$, respectively.

The vertical array directional vectors $\{a_{SubV(1)}(\alpha_{SV}, \phi_v), a_{SubV(2)}(\alpha_{SV}, \phi_v), a_{SubV(3)}(\alpha_{SV}, \phi_v)\}$ corresponding to the vertical array correlation vectors $\{h_{SubV(1)}(k, fs, w), h_{SubV(2)}(k, fs, w), h_{SubV(3)}(k, fs, w)\}$ are column vectors that are constituted by extracting the element numbers $\{VA \#1, VA \#2, VA \#3\}$, $\{VA \#4, VA \#5, VA \#6\}$, and $\{VA \#7, VA \#8, VA \#9\}$ of the directional vectors $a(\theta_u, \phi_v)$ of the virtual receiving array, respectively.

The vertical array maximum likelihood estimator 243 extracts, using the vertical array correlation vectors $\{h_{SubV(1)}(k, fs, w), h_{SubV(2)}(k, fs, w), h_{SubV(3)}(k, fs, w)\}$, angles $(\phi_{ML}^{(1)}), \phi_{ML}^{(2)})$ (i.e. NW=2 vertical angle-of-arrival candidates) at which the evaluation function $E_{SubV}$ (e.g. Eq. (12) or (15)) reaches its minimum or maximum.

In this way, by performing a maximum likelihood estimation process on a vertical direction, the vertical array maximum likelihood estimator 243 extracts, using signals (virtual receiving array correlation vectors) received by a virtual vertical linear array constituted by virtual receiving antennas, linearly arranged in the vertical direction, that belong to the plurality of virtual receiving antennas (in FIG. 7B, VA #1 to VA #9) included in a virtual receiving array constituted on the basis of an arrangement of transmitting array antennas (transmitting antennas 106) and receiving array antennas (receiving antennas 202), maximum likelihood values $(\phi_{ML}^{(1)}, \phi_{ML}^{(2)})$ corresponding to NW angles in the vertical direction.

That is, the horizontal array maximum likelihood estimator 242 and the vertical array maximum likelihood estimator 243 perform maximum likelihood estimation processes on horizontal and vertical one-dimensional directions, respectively.

Operation of Horizontal/Vertical Maximum Likelihood Estimator 244

The horizontal/vertical maximum likelihood estimator 244 estimates, using the output results ($\theta_{ML}^{(1)}$, $\theta_{ML}^{(2)}$, ..., $\theta_{ML}^{(NW)}$) inputted from the horizontal array maximum likelihood estimator 242, that serve as maximum likelihood values (horizontal angle-of-arrival candidates) in the horizontal search grids and the output results ($\phi_{ML}^{(1)}$, $\phi_{ML}^{(2)}$, ..., $\phi_{ML}^{(NW)}$), inputted from the vertical array maximum likelihood estimator 243, that serve as maximum likelihood values (vertical angle-of-arrival candidates) in the vertical search grids, the directions of arrival ($\theta^{(1)}$, $\phi^{(1)}$, $\theta^{(2)}$, $\phi^{(2)}$, ..., $\theta^{(NW)}$, $\phi^{(NW)}$) of NW incoming waves in a two-dimensional plane extending in horizontal and vertical directions.

Specifically, the horizontal/vertical maximum likelihood estimator 244 performs a horizontal and vertical two-dimensional maximum likelihood estimation process in limited search grids using, as search angle candidates, combinations of angles of arrival ($\theta_{ML}^{(1)}$, $\theta_{ML}^{(2)}$, ..., $\theta_{ML}^{(NW)}$) corresponding to horizontal maximum likelihood values and angles of arrival ($\phi_{ML}^{(1)}$, $\phi_{ML}^{(2)}$, ..., $\phi_{ML}^{(NW)}$) corresponding to vertical maximum likelihood values.

The horizontal maximum likelihood values $\theta_{ML}^{(1)}$, $\theta_{ML}^{(2)}$, ..., $\theta_{ML}^{(NW)}$ and the vertical maximum likelihood values $\phi_{ML}^{(1)}$, $\phi_{ML}^{(2)}$, ..., $\phi_{ML}^{(NW)}$ constitute a maximum of (NW×NW) lattice points in a case where they do not overlap in a two-dimensional plane extending in horizontal and vertical directions.

The horizontal/vertical maximum likelihood estimator 244 estimates maximum likelihood values using the maximum of (NW×NW) lattice points. That is, the horizontal/vertical maximum likelihood estimator 244 performs a horizontal and vertical two-dimensional maximum likelihood estimation process using a limited range of the maximum of (NW×NW) lattice points as search grids.

Accordingly, the horizontal/vertical maximum likelihood estimator 244 searches for NW different combinations from the (NW×NW) lattice points. Therefore, $_{(NW \times NW)}C_{Nw}$ combinations of $\theta$ and $\phi$ constitute the number of searches of horizontal and vertical two-dimensional maximum likelihood estimation.

Figure 8:
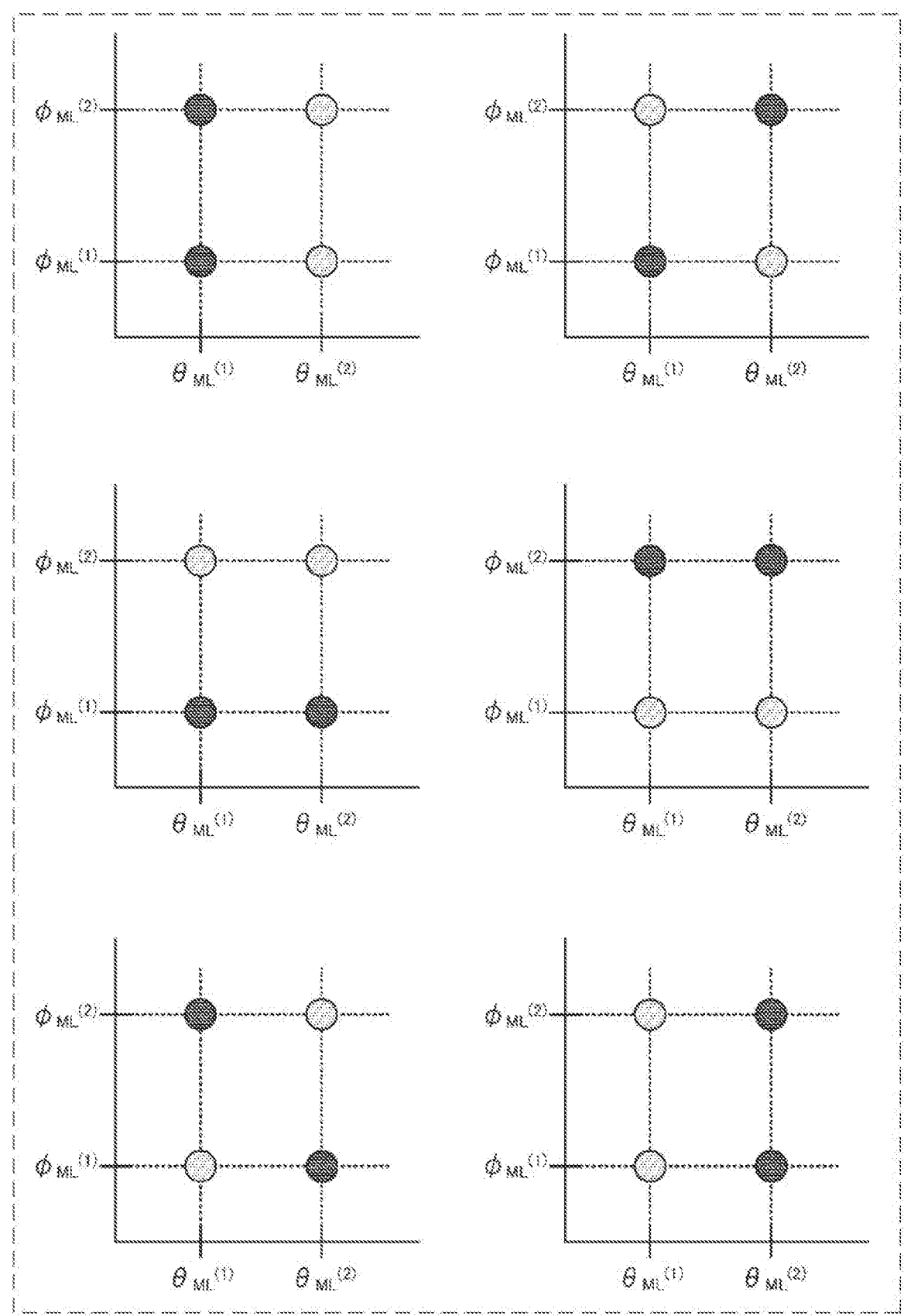
FIG. 8 is a diagram showing examples of search grids at the time of a two-dimensional maximum likelihood estimation according to the embodiment.

For example, FIG. 8 shows search grids in a case where the number of incoming waves NW is 2.

In the example shown in FIG. 8, the horizontal maximum likelihood values $\theta_{ML}^{(1)}$ and $\theta_{ML}^{(2)}$ and the vertical maximum likelihood values $\phi_{ML}^{(1)}$ and $\phi_{ML}^{(2)}$ constitute the presence of four lattice points. As shown in FIG. 8, the four lattice points constitute a total of six ($=_{4}C_{2}$) combinations for searching for two lattice points differing from each other.

In a horizontal and vertical two-dimensional maximum likelihood estimation, the horizontal/vertical maximum likelihood estimator 244 extracts, using the virtual receiving array correlation vector $h_{\_after\_cal}(k, fs, w)$ with corrections made for the inter-antenna deviations, angles ($\theta^{(1)}$, $\phi^{(1)}$, $\theta^{(2)}$, $\phi^{(2)}$, ..., $\theta^{(NW)}$, $\phi^{(NW)}$) at which a predetermined evaluation function $E_{ML2D}(\theta^{(1)}, \phi^{(1)}, \theta^{(2)}, \phi^{(2)}, ..., \theta^{(NW)}, \phi^{(NW)})$ based on the principles of maximum likelihood estimation reaches its minimum or maximum.

Usable examples of the predetermined evaluation function $E_{ML2D}(\theta^{(1)}, \phi^{(1)}, \theta^{(2)}, \phi^{(2)}, ..., \theta^{(NW)}, \phi^{(NW)})$ based on the principles of maximum likelihood estimation include the following equations (16), (17), and (18):

$$E_{ML2D}(\theta^{(1)},\phi^{(1)},\ldots,\theta^{(NW)},\phi^{(NW)}) = \|h_{\_after\_cal}(k,f_S,w) - A_{ML}S_{ML}\|^2 \quad (16)$$

$$A_{ML}=[\alpha(\theta^{(1)},\phi^{(1)}),\ldots,\alpha(\theta^{(NW)},\phi^{(NW)})] \quad (17)$$

$$S_{ML}=(A_{ML}^H A_{ML})^{-1} A_{ML}^H h_{\_after\_cal}(k,f_S,w) \quad (18)$$

Note here that $a(\theta_u, \phi_v)$ denotes the directional vector of the virtual receiving array. In Eq. (16), the angles ($\theta^{(1)}$, $\phi^{(1)}$, $\theta^{(2)}$, $\phi^{(2)}$, ..., $\theta^{(NW)}$, $\phi^{(NW)}$) that minimize the evaluation function $E_{ML2D}(\theta^{(1)}, \phi^{(1)}, \theta^{(2)}, \phi^{(2)}, ..., \theta^{(NW)}, \phi^{(NW)})$ are horizontal and vertical two-dimensional maximum likelihood values.

The horizontal/vertical maximum likelihood estimator 244 outputs $\theta_{ML2D}^{(1)}$, $\phi_{ML2D}^{(1)}$, $\theta_{ML2D}^{(2)}$, $\phi_{ML2D}^{(2)}$, ..., $\theta_{ML2D}^{(NW)}$, $\phi_{ML2D}^{(NW)}$, which serve as horizontal and vertical two-dimensional maximum likelihood values in the limited search grids. Further, the horizontal/vertical maximum likelihood estimator 244 may output, as direction-of-arrival estimation results, the angle-of-arrival estimate values ($\theta_{ML2D}^{(1)}$, $\phi_{ML2D}^{(1)}$, $\theta_{ML2D}^{(2)}$, $\phi_{ML2D}^{(2)}$, ..., $\theta_{ML2D}^{(NW)}$, $\phi_{ML2D}^{(NW)}$) thus calculated and the discrete times k and Doppler frequencies $f_s\Delta\phi$ at which they were calculated.

In the example shown in FIG. 8, the horizontal/vertical maximum likelihood estimator 244 determines the angles of arrival of NW=2 incoming waves in a two-dimensional plane from among combinations of directions $\theta_{ML}^{(1)}$ and $\theta_{ML}^{(2)}$ (angle-of-arrival candidates) corresponding to horizontal maximum likelihood values and directions $\phi_{ML}^{(1)}$ and $\phi_{ML}^{(2)}$ (angle-of-arrival candidates) corresponding to vertical maximum likelihood values. Specifically, the horizontal/vertical maximum likelihood estimator 244 estimates, as the angles of arrival ($\theta^{(1)}$, $\phi^{(1)}$, $\theta^{(2)}$, $\phi^{(2)}$) of NW=2 incoming waves, directions corresponding to maximum likelihood values that are obtained by performing a maximum likelihood estimation process on the two-dimensional plane with respect to the combinations of horizontal angle-of-arrival candidates ($\theta_{ML}^{(1)}$, $\theta_{ML}^{(2)}$) and vertical angle-of-arrival candidates ($\phi_{ML}^{(1)}$, $\phi_{ML}^{(2)}$).

Of parameters that are used for the evaluation function, $(A_{ML}^H A_{ML})^{-1} A_{ML}^H$ included in Eq. (16), which is a parameter pertaining to the directional vector $a(\theta_u, \phi_v)$, is a value that is determined depending on the virtual receiving array arrangement and is a fixed value for each angle. The horizontal/vertical maximum likelihood estimator 244 may calculate $(A_{ML}^H A_{ML})^{-1} A_{ML}^H$ for each angle in the horizontal and vertical search grids. Alternatively, the horizontal/vertical maximum likelihood estimator 244 may use a configuration in which results of the calculation of $(A_{ML}^H A_{ML})^{-1} A_{ML}^H$ are stored in advance in the form of a table and read out for each separate angle. This eliminates the need for a part of the arithmetic processing indicated by Eq. (18), making it possible to reduce computational complexity. Further, in the case of the use of the configuration in which readouts are given for each separate angle, it is possible to reduce arithmetic circuits such as multipliers or adders, although there is a need for a memory circuit for storing $(A_{ML}^H A_{ML})^{-1} A_{ML}^H$.

Another usable example of the predetermined evaluation function $E_{ML2D}\theta^{(1)}, \phi^{(1)}, \theta^{(2)}, \phi^{(2)}, ..., \theta^{(NW)}, \phi^{(NW)}$ based on the principles of maximum likelihood estimation may be the following equation (19). In Eq. (19), angles that maximize the evaluation function $E_{ML2D}\theta^{(1)}, \phi^{(1)}, \theta^{(2)}, \phi^{(2)}, ..., \theta^{(NW)}, \phi^{(NW)}$ are horizontal and vertical two-dimensional maximum likelihood values. The horizontal/vertical maximum likelihood estimator 244 outputs $\theta_{ML2D}^{(1)}$, $\phi_{ML2D}^{(1)}$, $\theta_{ML2D}^{(2)}$, $\phi_{ML2D}^{(2)}$, ..., $\theta_{ML2D}^{(NW)}$, $\phi_{ML2D}^{(NW)}$ which serve as horizontal and vertical two-dimensional maximum likelihood values in the aforementioned limited search grids.

$$E_{ML2D}(\theta^{(1)},\phi^{(1)},\ldots,\theta^{(NW)},\phi^{(NW)}) = \|A_{ML}S_{ML}\|^2 \quad (19)$$

The foregoing has described how the direction estimator 214 operates.

As noted above, in the direction estimator 214, the horizontal array maximum likelihood estimator 242 and the vertical array maximum likelihood estimator 243 each perform a maximum likelihood estimation process in horizontal or vertical one-dimensional search grids. Moreover, on the basis of the maximum likelihood values estimated by the horizontal array maximum likelihood estimator 242 and the vertical array maximum likelihood estimator 243 in the one-dimensional search grids, the horizontal/vertical maximum likelihood estimator 244 limits search grids in a two-dimensional plane extending in horizontal and vertical directions and performs a maximum likelihood estimation process in the search grids thus limited.

That is, the direction estimator 214 performs a maximum likelihood estimation process in two stages, namely each of the horizontal and vertical one-dimensional directions and the horizontal and vertical two-dimensional plane. This allows the present embodiment to greatly reduce the number of searches (computational complexity) in comparison with a case (conventional method) where a two-dimensional maximum likelihood estimation process is performed in all horizontal and vertical search grids.

For example, a case is described where the number of horizontal search grids is NGH and the number of vertical search grids is HGV.

In this case, the present embodiment is configured such that the total number of searches that are performed by the horizontal array maximum likelihood estimator 242 and the vertical array maximum likelihood estimator 243 is $(_{(NGH)}C_{NW}+_{(NGV)}C_{NW})$. Furthermore, the number of searches that are performed by the horizontal/vertical maximum likelihood estimator 244 is made to be $_{(Nw \times Nw)}C_{Nw}$ by limiting the search range to outputted angular ranges of the horizontal array maximum likelihood estimator 242 and the vertical array maximum likelihood estimator 243.

As opposed to this, the number of searches in a conventional method involving the use of horizontal and vertical two-dimensional grids is $(_{(NGV \times NGH)}C_{NW})$.

Therefore, the present embodiment achieves a ratio of reduction of approximately $\{(NGV^{NW}+NGH^{NW})/(NGV \times NGH)^{NW}\}$ in comparison with the conventional method. For example, in a case where NGV=NGH=N, the method according to the present embodiment achieves a ratio of reduction of $2/N^{NW}$ with respect to the conventional method. For example, in a case where N=10 and NW=2, the number of searches can be reduced to approximately 1/50 with respect to the conventional method.

Further, the larger the numbers of search grids NGH and NGV are or the larger the number of incoming waves NW is, the more effective the present embodiment becomes in reducing the number of searches.

Figure 9:
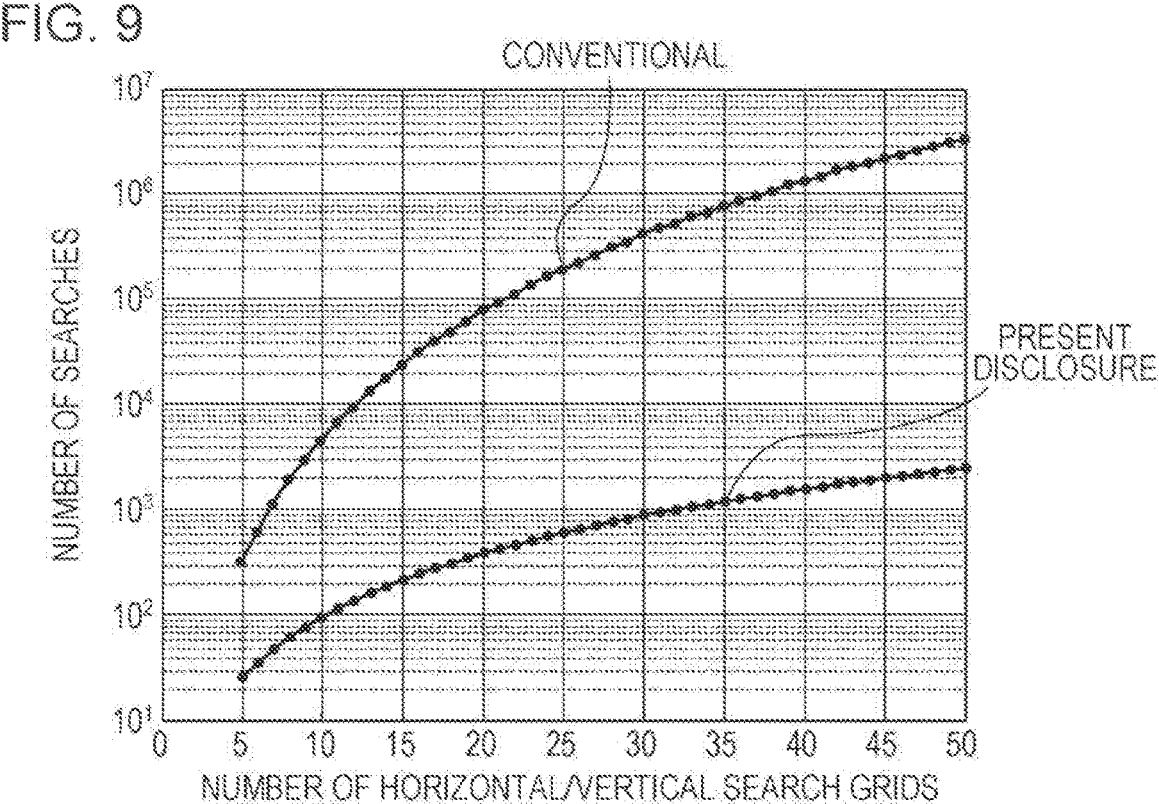
FIG. 9 is a diagram showing an example of the number of searches with respect to the number of search grids according to the embodiment.

FIG. 9 shows an example of the number of searches with respect to the number of search grids NGV=NGH=N in a case where the number of incoming waves NW is 2. As shown in FIG. 9, the method (present disclosure) according to the present embodiment makes it possible to confirm a reduction in the number of searches in comparison with the conventional method. Further, as shown in FIG. 9, it can be confirmed that the larger the number of search grids N (NGH, HGV) becomes, the more effective the present embodiment becomes in reducing the number of searches.

Figure 10:
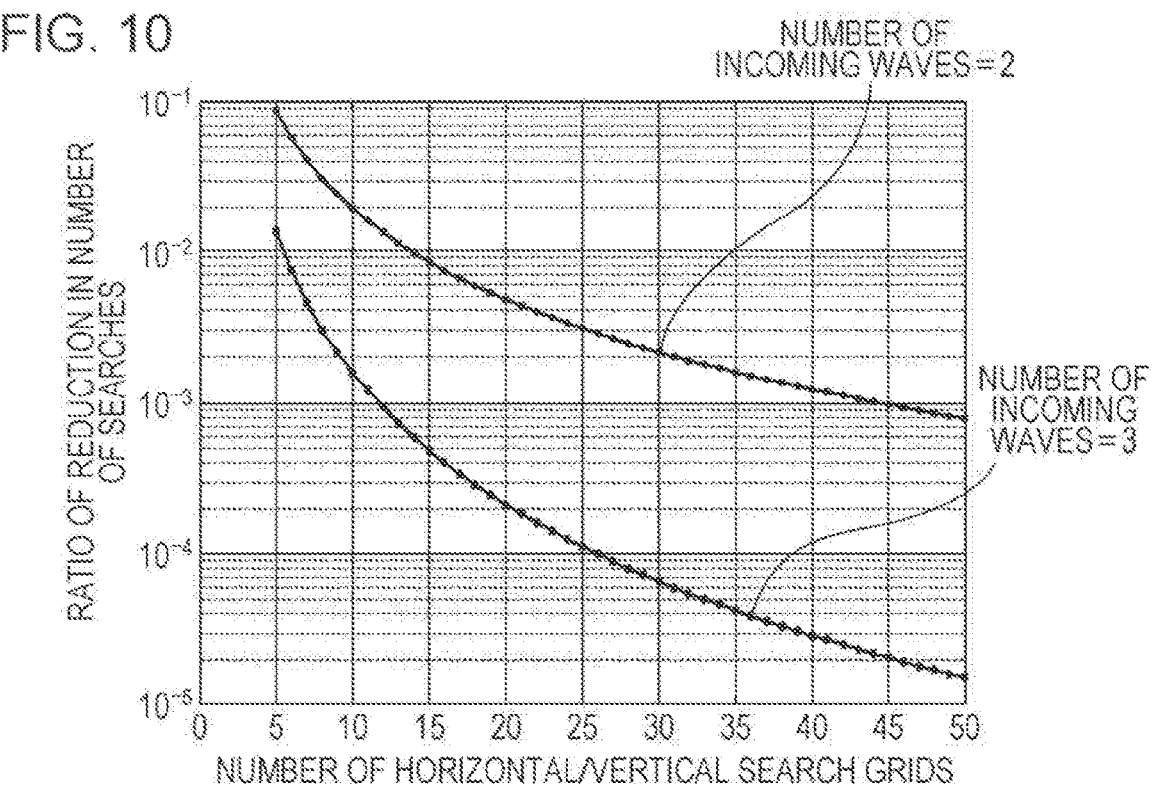
FIG. 10 is a diagram showing an example of a ratio of reduction in the number of searches with respect to the number of search grids according to the embodiment.

FIG. 10 shows an example of a ratio of reduction in the number of searches with respect to the conventional method by the method according to the present embodiment with respect to the number of search grids NGV=NGH=N in cases where the number of incoming waves NW is 2 and 3. As shown in FIG. 10, it can be confirmed that the larger the number of search grids N (NGH, NGV) is or the larger the number of incoming waves NW is, the more effective the present embodiment becomes in reducing the number of searches.

As noted above, according to the present embodiment, the radar apparatus 10 can measure an angle with a high degree of accuracy while suppressing an increase in computational complexity by reducing the number of searches in making a direction-of-arrival estimation using the maximum likelihood estimation method.

Variation 1 of the Embodiment

The foregoing embodiment has described a case where maximum likelihood values are outputted as horizontal or vertical one-dimensional maximum likelihood estimation results and a two-dimensional maximum likelihood estimation process is performed. As opposed to this, Variation 1 describes a case where maximum likelihood values and angle candidates other than the maximum likelihood values are outputted as horizontal or vertical one-dimensional maximum likelihood estimation results and a two-dimensional maximum likelihood estimation process is performed.

Figure 11:
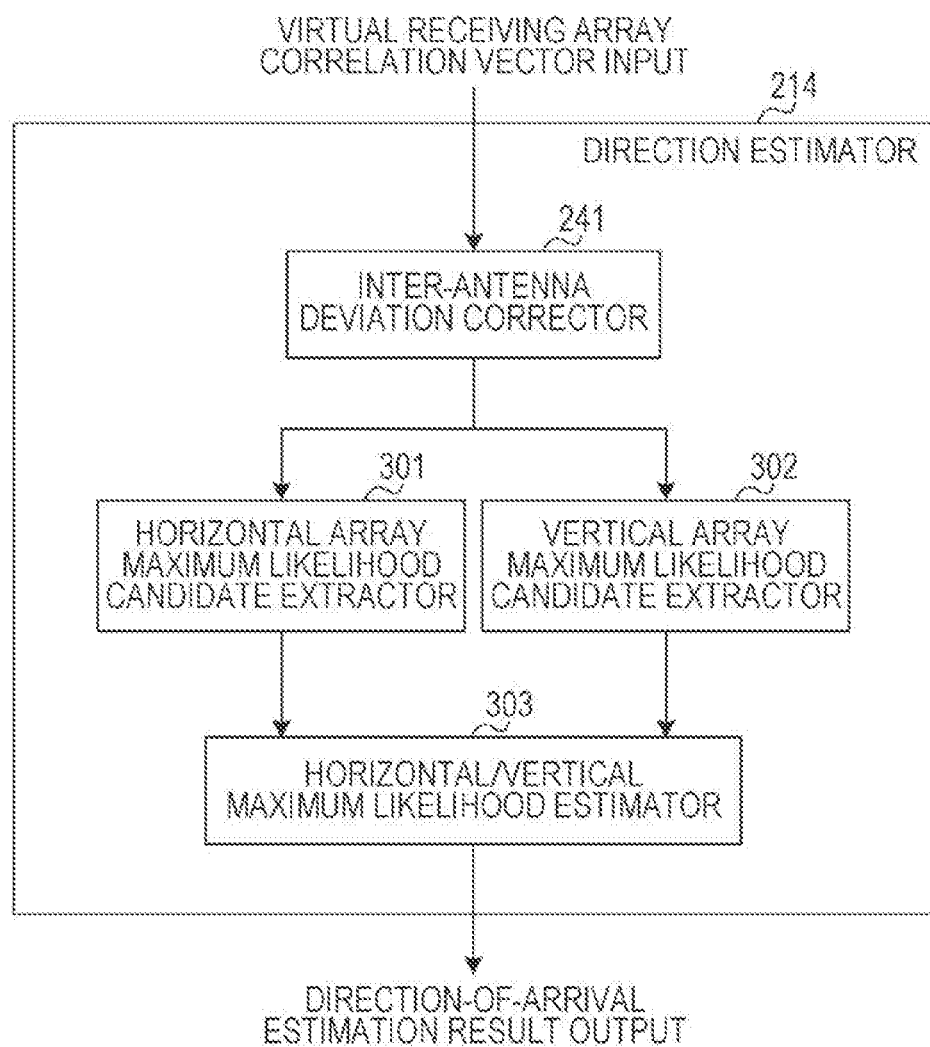
FIG. 11 is a block diagram showing an internal configuration of a direction estimator according to Variation 1 of the embodiment.

FIG. 11 is a block diagram showing an example internal configuration of the direction estimator 214 according to Variation 1. It should be noted that components in FIG. 11 which are identical to those of the foregoing embodiment (FIG. 6) are given the same reference numerals and are not described here.

The following describes, as an example, a case where the number of incoming waves at the radar apparatus 10 (FIG. 2) is 2 (NW=2).

Operation of Horizontal Array Maximum Likelihood Candidate Extractor 301

In FIG. 11, the horizontal array maximum likelihood candidate extractor 301 performs the following process on the basis of the virtual receiving array correlation vector $h\_{after\_cal}(k, fs, w)$ with corrections made for the inter-antenna deviations, which is inputted from the inter-antenna deviation corrector 241.

Specifically, first, the horizontal array maximum likelihood candidate extractor 301 extracts, from elements, included in the virtual receiving array correlation vector $h\_{after\_cal}(k, fs, w)$ with corrections made for the inter-antenna deviations, that correspond to the virtual receiving antennas VA #1, . . . , VA #(Nt×Na), respectively, a horizontal array correlation vector $h_{SubH}(k, fs, w)$ composed of elements of a virtual horizontal linear array constituting a linear array of three or more antennas in a horizontal direction on the virtual receiving array.

Then, the horizontal array maximum likelihood candidate extractor 301 performs a maximum likelihood estimation process on the horizontal direction using the horizontal array correlation vector $h_{SubH}(k, fs, w)$ thus extracted. In the horizontal maximum likelihood estimation process, the horizontal array maximum likelihood candidate extractor 301 calculates, in a predetermined horizontal search grid, an angle (maximum likelihood value) at which a predetermined evaluation function $E_{SubH}(\theta^{(1)}, \theta^{(2)}, \ldots, \theta^{(NW)})$ based on the principles of maximum likelihood estimation reaches its minimum or maximum. In Variation 1, the horizontal array maximum likelihood candidate extractor 301 extracts, in addition to the maximum likelihood values (which correspond to NW angles), local maximum likelihood values (extreme values) (respectively corresponding to the NW angles) other than the maximum likelihood values of an evaluation function that is used in the maximum likelihood estimation process on the horizontal direction. Then, the horizontal array maximum likelihood candidate extractor 301 outputs, to the horizontal/vertical maximum likelihood estimator 303, the NW angles, which correspond to the maximum likelihood values, and horizontal angle-of-arrival candidates (maximum likelihood candidates), respectively including the NW angles, which correspond to at least one local maximum likelihood value (extreme value) other than the maximum likelihood values of the evaluation function.

An angle that serves as a local maximum likelihood value is for example a value that satisfies the following conditions:
(1) Case Where Minimum Value of Predetermined Evaluation Function Based on Principles of Maximum Likelihood Estimation Serves as Maximum Likelihood Value The horizontal array maximum likelihood candidate extractor 301 extracts angles $(\theta_{NHLocalML}^{(1)}, \theta_{NHLocalML}^{(2)}, \ldots, \theta_{NHLocalML}^{(NW)})$ that give a local minimum value (minimal value) $E_{SubH}(\theta^{(1)}, \theta^{(2)}, \ldots, \theta^{(NW)})$ that satisfies the condition indicated by Eq. (20) as follows:

$$E_{SubH}(\theta^{(1)}, \theta^{(2)}, \ldots, \theta^{(NW)}) < \alpha_H \times E_{HML} \qquad (20)$$

Note, however, that NHLocalML=1, ..., $N_{HLM}$. Further, $E_{HML}$ is the minimum value (maximum likelihood value) $[\theta_{ML}^{(1)}, \theta_{ML}^{(2)}, \theta_{ML}^{(NW)}]$ of the evaluation function $E_{SubH}(\theta^{(1)}, \theta^{(2)}, \ldots, \theta^{(NW)})$ in the predetermined horizontal search grid. Further, $\alpha_H$ is a predetermined value ($\alpha_H > 1$). That is, Eq. (21) is satisfied as follows:

$$E_{HML} = E_{SubH}(\theta_{ML}^{(1)}, \theta_{ML}^{(2)}, \ldots, \theta_{ML}^{(NW)}) \qquad (21)$$

It should be noted that in a case where a local minimum value that satisfies the condition indicated by Eq. (20) exceeds a predetermined number $N_H$ ($N_{HLM} > N_H$), the horizontal array maximum likelihood candidate extractor 301 may output not more than $N_H$ candidates with priority given to smallness in value of the evaluation function $E_{SubH}(\theta^{(1)}, \theta^{(2)}, \ldots, \theta^{(NW)})$.

(2) Case Where Maximum Value of Predetermined Evaluation Function Based on Principles of Maximum Likelihood Estimation Serves as Maximum Likelihood Value The horizontal array maximum likelihood candidate extractor 301 extracts angles $(\theta_{NHLocalML}^{(1)}, \theta_{NHLocalML}^{(2)}, \ldots, \theta_{NHLocalML}^{(NW)})$ that give a local maximum value (maximal value) $E_{SubH}(\theta^{(1)}, \theta^{(2)}, \ldots, \theta^{(NW)})$ that satisfies the condition indicated by Eq. (22) as follows:

$$E_{subH}(\theta^{(1)}, \theta^{(2)}, \ldots, \theta^{(NW)}) > \alpha_H \times E_{HML} \qquad (22)$$

Note, however, that NHLocalML=1, ..., $N_{HLM}$. Further, $E_{HML}$ is the maximum value (maximum likelihood value) $[(\theta_{ML}^{(1)}, \theta_{ML}^{(2)}, \ldots, \theta_{ML}^{(NW)})]$ of the evaluation function $E_{SubH}(\theta^{(1)}, \theta^{(2)}, \ldots, \theta^{(NW)})$ in the predetermined horizontal search grid. Further, $\alpha_H$ is a predetermined value ($\alpha_H < 1$). That is, Eq. (23) is satisfied as follows:

$$E_{HML} = E_{subH}(\theta_{ML}^{(1)}, \theta_{ML}^{(2)}, \ldots, \theta_{ML}^{(NW)}) \qquad (23)$$

It should be noted that in a case where a local maximum value that satisfies the condition indicated by Eq. (22) exceeds a predetermined number $N_H$ ($N_{HLM} > N_H$), the horizontal array maximum likelihood candidate extractor 301 may output not more than $N_H$ candidates with priority given to largeness in value of the evaluation function $E_{SubH}(\theta^{(1)}, \theta^{(2)}, \ldots \theta^{(NW)})$.

Operation of Vertical Array Maximum Likelihood Candidate Extractor 302

The vertical array maximum likelihood candidate extractor 302 performs the following process on the basis of the virtual receiving array correlation vector $h_{\_after\_cal}(k, fs, w)$ with corrections made for the inter-antenna deviations, which is inputted from the inter-antenna deviation corrector 241.

Specifically, first, the vertical array maximum likelihood candidate extractor 302 extracts, from elements, included in the virtual receiving array correlation vector $h_{\_after\_cal}(k, fs, w)$ with corrections made for the inter-antenna deviations, that correspond to the virtual receiving antennas VA #1, ..., VA #(Nt×Na), respectively, a vertical array correlation vector $h_{SubV}(k, fs, w)$ composed of elements of a virtual vertical linear array constituting a linear array of three or more antennas in a vertical direction on the virtual receiving array.

Then, the vertical array maximum likelihood candidate extractor 302 performs a maximum likelihood estimation process on the vertical direction using the vertical array correlation vector $h_{SubV}(k, fs, w)$ thus extracted. In the vertical maximum likelihood estimation process, the vertical array maximum likelihood candidate extractor 302 calculates, in a predetermined vertical search grid, an angle (maximum likelihood value) at which a predetermined evaluation function $E_{SubV}(\phi^{(1)}, \phi^{(2)}, \ldots, \phi^{(NW)})$ based on the principles of maximum likelihood estimation reaches its minimum or maximum. In Variation 1, the vertical array maximum likelihood candidate extractor 302 extracts, in addition to the maximum likelihood values (which correspond to NW angles), at least one local maximum likelihood value (extreme value) (respectively corresponding to the NW angles) other than the maximum likelihood values of an evaluation function that is used in the maximum likelihood estimation process on the vertical direction. Then, the vertical array maximum likelihood candidate extractor 302 outputs, to the horizontal/vertical maximum likelihood estimator 303, the NW angles, which correspond to the maximum likelihood values, and vertical angle-of-arrival candidates (maximum likelihood candidates), respectively including the NW angles, which correspond to at least one local maximum likelihood value (extreme value) other than the maximum likelihood values of the evaluation function.

An angle that serves as a local maximum likelihood value is for example a value that satisfies the following conditions:
(1) Case Where Minimum Value of Predetermined Evaluation Function Based on Principles of Maximum Likelihood Estimation Serves as Maximum Likelihood Value The vertical array maximum likelihood candidate extractor 302 extracts angles $(\phi_{NVLocalML}^{(1)}, \phi_{NVLocalML}^{(2)}, \ldots, \phi_{NVLocalML}^{(NW)})$ that give a local minimum value (minimal value) $E_{subV}(\phi^{(1)}, \phi^{(2)}, \ldots, \phi^{(NW)})$ that satisfies the condition indicated by Eq. (24) as follows:

$$E_{SubV}(\phi^{(1)}, \phi^{(2)}, \ldots, \phi^{(NW)}) < \alpha_V \times E_{VML} \qquad (24)$$

Note, however, that NVLocalML=1, ..., $N_{VLM}$. Further, $E_{VML}$ is the minimum valu $[(\phi_{ML}^{(1)}, \phi_{ML}^{(2)}, \ldots, \phi_{ML}^{(NW)})]$ of the evaluation function $E_{SubV}(\phi^{(1)}, \phi^{(2)}, \ldots, \phi^{(NW)})$ in the predetermined vertical search grid. Further, $\alpha_V$ is a predetermined value ($\alpha_V > 1$).

That is, Eq. (25) is satisfied as follows:

$$E_{VML} = E_{subV}(\phi_{ML}^{(1)}, \phi_{ML}^{(2)}, \ldots, \phi_{ML}^{(NW)}) \qquad (25)$$

It should be noted that in a case where a local minimum value that satisfies the condition indicated by Eq. (24) exceeds a predetermined number $N_V$ ($N_{VLM} > N_V$), the vertical array maximum likelihood candidate extractor 302 may output not more than $N_V$ candidates with priority given to smallness in value of the evaluation function $E_{SubH}(\phi^{(1)}, \phi^{(2)}, \ldots, \phi^{(NW)})$.

(2) Case Where Maximum Value of Predetermined Evaluation Function Based on Principles of Maximum Likelihood Estimation Serves as Maximum Likelihood Value The vertical array maximum likelihood candidate extractor 302 extracts angles ($\phi_{NVLocalML}^{(1)}$, $\phi_{NVLocalML}^{(2)}$, ..., $\phi_{NVLocalML}^{(NW)}$) that give a local maximum value (maximal value) $E_{subV}(\phi^{(1)}, \phi^{(2)}, \ldots, \phi^{(NW)})$ that satisfies the condition indicated by Eq. (26) as follows:

$$E_{subV}(\phi^{(1)}, \phi^{(2)}, \ldots, \phi^{(NW)}) > \alpha_V \times E_{VML} \quad (26)$$

Note, however, that NVLocalML=1, ..., $N_{VLM}$. Further, $E_{VML}$ is the maximum value (maximum likelihood value) [$\phi_{ML}^{(1)}$, $\phi_{ML}^{(2)}$, ..., $\phi_{ML}^{(NW)}$] of the evaluation function $E_{SubV}(\phi^{(1)}, \phi^{(2)}, \ldots, \phi^{(NW)})$ in the predetermined vertical search grid. Further, $\alpha_V$ is a predetermined value ($\alpha_V<1$). That is, Eq. (27) is satisfied as follows:

$$E_{VML} = E_{subV}(\phi_{ML}^{(1)}, \phi_{ML}^{(2)}, \ldots, \phi_{ML}^{(NW)}) \quad (27)$$

It should be noted that in a case where a local minimum value that satisfies the condition indicated by Eq. (26) exceeds a predetermined number $N_V$ ($N_{VLM}>N_V$), the vertical array maximum likelihood candidate extractor 302 may output not more than $N_V$ candidates with priority given to largeness in value of the evaluation function $E_{SubV}(\phi^{(1)}, \phi^{(2)}, \ldots, \phi^{(NW)})$.

Operation of Horizontal/Vertical Maximum Likelihood Estimator 303

The horizontal/vertical maximum likelihood estimator 303 estimates, using the angle output results [($\phi_{ML}^{(1)}$, $\phi_{ML}^{(2)}$, ..., $\phi_{ML}^{(NW)}$] and [$\phi_{NHLocalML}^{(1)}$, $\phi_{NHLocalML}^{(2)}$, ..., $\phi_{NHLocalML}^{(NW)}$] (NHLocalML=1, ..., $N_{HLM}$), inputted from the horizontal array maximum likelihood candidate extractor 301, that serve as maximum likelihood values (horizontal angle-of-arrival candidates) in the horizontal search grids and the angle output results [($\phi_{ML}^{(1)}$, $\phi_{ML}^{(2)}$, ..., $\phi_{ML}^{(NW)}$] and [$\phi_{NVLocalML}^{(1)}$, $\phi_{NVLocalML}^{(2)}$, ..., $\phi_{NVLocalML}^{(NW)}$] (NVLocalML=1, ..., $N_{VLM}$), inputted from the vertical array maximum likelihood candidate extractor 302, that serve as maximum likelihood values (vertical angle-of-arrival candidates) in the vertical search grids, the directions of arrival $\theta^{(1)}$, $\phi^{(1)}$, $\theta^{(2)}$, $\phi^{(2)}$, ..., $\theta^{(NW)}$, $\phi^{(NW)}$) of NW incoming waves in a two-dimensional plane extending in horizontal and vertical directions.

Specifically, the horizontal/vertical maximum likelihood estimator 303 performs a horizontal and vertical two-dimensional maximum likelihood estimation process in limited search grids using, as search angle candidates, combinations of angle-of-arrival candidates corresponding to horizontal maximum likelihood values and angle-of-arrival candidates corresponding to vertical maximum likelihood values.

The following describes the details of a horizontal and vertical two-dimensional maximum likelihood estimation process in the horizontal/vertical maximum likelihood estimator 303.

The horizontal/vertical maximum likelihood estimator 303 takes out any one maximum likelihood candidate from among [$\theta_{ML}^{(1)}$, $\theta_{ML}^{(2)}$, ..., $\theta_{ML}^{(NW)}$] and [$\theta_{NHLocalML}^{(1)}$, $\theta_{NHLocalML}^{(2)}$, ..., $\theta_{NHLocalML}^{(NW)}$] (NHLocalML= ..., $N_{HLM}$), which serve as horizontal maximum likelihood candidates. Further, the horizontal/vertical maximum likelihood estimator 303 takes out any one maximum likelihood candidate from among [($\phi_{ML}^{(1)}$, $\phi_{ML}^{(2)}$, ..., $\phi_{ML}^{(NW)}$] and [$\phi_{NVLocalML}^{(1)}$, $\phi_{NVLocalML}^{(2)}$, ..., $\phi_{NVLocalML}^{(NW)}$] (NVLocalML=1, ..., $N_{VLM}$), which serve as vertical maximum likelihood candidates. Then, the horizontal/vertical maximum likelihood estimator 303 performs NW different combinations of searches (two-dimensional maximum likelihood estimation processes) from horizontal and vertical two-dimensional (NW×NW) lattice points on the basis of the horizontal and vertical maximum likelihood candidates thus taken out. Therefore, $_{(Nw \times Nw)}C_{Nw}$ combinations of $\theta$ and $\phi$ constitute the number of searches of horizontal and vertical two-dimensional maximum likelihood estimation.

In a horizontal and vertical two-dimensional maximum likelihood estimation, the horizontal/vertical maximum likelihood estimator 303 extracts, using the virtual receiving array correlation vector h$_{after\_cal}$(k, fs, w) with corrections made for the inter-antenna deviations, angles $\theta^{(1)}$, $\phi^{(1)}$, $\theta^{(2)}$, $\phi^{(2)}$, ..., $\theta^{(NW)}$, $\phi^{(NW)}$ at which the predetermined evaluation function $E_{ML2D}\theta^{(1)}$, $\phi^{(1)}$, $\theta^{(2)}$, $\phi^{(2)}$, ..., $\theta^{(NW)}$, $\phi^{(NW)}$ based on the principles of maximum likelihood estimation reaches its minimum or maximum. Further the horizontal/vertical maximum likelihood estimator 303 temporarily stores the angles thus extracted and evaluation function values corresponding to the angles.

Next, for a horizontal and vertical two-dimensional maximum likelihood estimation which is similar to that described above, the horizontal/vertical maximum likelihood estimator 303 takes out another maximum likelihood candidate from among [$\theta_{ML}^{(1)}$, $\theta_{ML}^{(2)}$, ..., $\theta_{ML}^{(NW)}$] and [$\theta_{NHLocalML}^{(1)}$, $\theta_{NHLocalML}^{(2)}$, ..., $\theta_{NHLocalML}^{(NW)}$] (NHLocalML=1, ..., $N_{HLM}$), which serve as horizontal maximum likelihood candidates. Further, the horizontal/vertical maximum likelihood estimator 303 takes out another maximum likelihood candidate from among [$\phi_{ML}^{(1)}$, $\phi_{ML}^{(2)}$, ..., $\phi_{ML}^{(NW)}$] and [$\phi_{NVLocalML}^{(1)}$, $\phi_{NVLocalML}^{(2)}$, ..., $\phi_{NVLocalML}^{(NW)}$] (NVLocalML=1, ..., $N_{VLM}$), which serve as vertical maximum likelihood candidates. Then, the horizontal/vertical maximum likelihood estimator 303 performs NW different combinations of searches (two-dimensional maximum likelihood estimation processes) from horizontal and vertical two-dimensional (NW×NW) lattice points on the basis of the horizontal and vertical maximum likelihood candidates thus taken out.

Further, in a case where an evaluation function whose minimum value is a maximum likelihood value is used and an evaluation function value corresponding to an extracted angle is smaller than a temporarily-stored evaluation function value, the horizontal/vertical maximum likelihood estimator 303 updates temporarily-stored content using the evaluation function value and the corresponding angle (maximum likelihood value). In a case where an evaluation function whose maximum value is a maximum likelihood value is used, the horizontal/vertical maximum likelihood estimator 303 updates the temporarily-stored content in a case where an evaluation function value corresponding to an extracted angle is larger than a temporarily-stored evaluation function value.

In this way, the horizontal/vertical maximum likelihood estimator 303 takes out the aforementioned maximum likelihood values and updates the maximum likelihood value and the temporarily-stored content (evaluation function values and angles) for all combinations of horizontal and vertical maximum likelihood candidates. Note here that there are a total of ($N_{HLM}$+1)×($N_{VLM}$+1) combinations of horizontal and vertical maximum likelihood candidates.

As a result, angles temporarily stored at the end of searches for all combinations of maximum likelihood candidates serve as angles at which the predetermined evaluation function $E_{ML2D}(\theta^{(1)}, \phi^{(1)}, \theta^{(2)}, \phi^{(2)}, \ldots, \theta^{(NW)}, \phi^{(NW)})$ based on the principles of maximum likelihood estimation reaches its minimum or maximum among the combinations of angles searched. The horizontal/vertical maximum likelihood estimator 303 outputs the angles as horizontal and vertical two-dimensional direction-of-arrival estimate values.

In this way, the horizontal/vertical maximum likelihood estimator 303 determines the angles of arrival of NW incoming waves in the two-dimensional plane from among the combinations of horizontal angle-of-arrival candidates and vertical angle-of-arrival candidates.

The following describes, as an example, a case where the number of incoming waves NW is 2.

In a case where the number of incoming waves NW is 2, horizontal maximum likelihood candidates $\theta^{(1)}$ and $\theta^{(2)}$ and vertical maximum likelihood candidates $\phi^{(1)}$ and $\phi^{(2)}$ are taken out as another combination of maximum likelihood candidates; therefore, as is the case in FIG. 8, the four lattice points constitute a total of six ($=_4C_2$) combinations for searching for two lattice points differing from each other.

For example, in a case where horizontal maximum likelihood values $\theta_{ML}^{(1)}$ and $\theta_{ML}^{(2)}$ and vertical maximum likelihood candidates $\phi_{ML}^{(1)}$ and $\phi_{ML}^{(2)}$ have been taken out as a combination of maximum likelihood candidates, the horizontal/vertical maximum likelihood estimator 303 calculates, using the virtual receiving array correlation vector $h\_{after\_cal}(k, fs, w)$ with corrections made for the inter-antenna deviations, angles $(\theta^{(1)}, \phi^{(1)}, \theta^{(2)}, \phi^{(2)})$ at which a predetermined evaluation function $E_{ML2D}(\theta^{(1)}, \phi^{(1)}, \theta^{(2)}, \phi^{(2)})$ based on the principles of maximum likelihood estimation reaches its minimum (case where the minimum value is a maximum likelihood value) or maximum (case where the maximum value is a maximum likelihood value) among the combinations of angles searched. Then, the horizontal/vertical maximum likelihood estimator 303 temporarily stores the angles thus extracted and evaluation function values corresponding to the angles.

Next, for example, in a case where the horizontal maximum likelihood values $\theta_{ML}^{(1)}$ and $\theta_{ML}^{(2)}$ and the angles $[\phi_{NVLocalML}^{(1)}, \phi_{NVLocalML}^{(2)}]$, which serve as extreme values in the vertical search grids, have been taken out as another combination of maximum likelihood candidates, the horizontal/vertical maximum likelihood estimator 303 calculates, using the virtual receiving array correlation vector $h\_{after\_cal}(k, fs, w)$ with corrections made for the inter-antenna deviations, the predetermined evaluation function $E_{ML2D}(\theta^{(1)}, \phi^{(1)}, \theta^{(2)}, \phi^{(2)})$ based on the principles of maximum likelihood estimation among the combinations of angles searched. Moreover, in a case where an evaluation function whose minimum value is a maximum likelihood value is used and a calculated evaluation function value is smaller than a temporarily-stored evaluation function value, the horizontal/vertical maximum likelihood estimator 303 updates the temporarily-stored content using the calculated evaluation function value and the corresponding angle. In a case where an evaluation function whose maximum value is a maximum likelihood value is used, the horizontal/vertical maximum likelihood estimator 303 updates the temporarily-stored content in a case where a calculated evaluation function value is larger than a temporarily-stored evaluation function value.

Further, in a case where the angles $[\theta_{NHLocalML}^{(1)}, \theta_{NHLocalML}^{(2)}]$, which serve as extreme values in the horizontal search grids, and the angles $[\phi_{ML}^{(1)}, \phi_{ML}^{(2)}]$, which serve as extreme values in the vertical search grids, have been taken out as another combination of maximum likelihood candidates, the horizontal/vertical maximum likelihood estimator 303 calculates, using the virtual receiving array correlation vector $h\_{after\_cal}(k, fs, w)$ with corrections made for the inter-antenna deviations, the predetermined evaluation function $E_{ML2D}(\theta^{(1)}, \phi^{(1)}, \theta^{(2)}, \phi^{(2)})$ based on the principles of maximum likelihood estimation among the combinations of angles searched. Moreover, in a case where a calculated evaluation function value is smaller (or larger) than a temporarily-stored evaluation function value, the horizontal/vertical maximum likelihood estimator 303 updates the temporarily-stored content using the calculated evaluation function value and the corresponding angle.

Further, in a case where the angles $[\theta_{NHLocalML}^{(1)}, \theta_{NHLocalML}^{(2)}]$, which serve as extreme values in the horizontal search grids, and the angles $[\phi_{NBLocalML}^{(1)}, \phi_{NVLocalML}^{(2)}]$, which serve as extreme values in the vertical search grids, have been taken out as another combination of maximum likelihood candidates, the horizontal/vertical maximum likelihood estimator 303 calculates, using the virtual receiving array correlation vector $h\_{after\_cal}(k, fs, w)$ with corrections made for the inter-antenna deviations, the predetermined evaluation function $E_{ML2D}(\theta^{(1)}, \phi^{(1)}, \theta^{(2)}, \phi^{(2)})$ based on the principles of maximum likelihood estimation among the combinations of angles searched. Moreover, in a case where a calculated evaluation function value is smaller (or larger) than a temporarily-stored evaluation function value, the horizontal/vertical maximum likelihood estimator 303 updates the temporarily-stored content using the calculated evaluation function value and the corresponding angle.

There are a total of $(N_{HLM}+1) \times (N_{VLM}+1)$ combinations of horizontal and vertical maximum likelihood candidates. The horizontal/vertical maximum likelihood estimator 303 calculates the predetermined evaluation function $E_{ML2D}(\theta^{(1)}, \phi^{(1)}, \theta^{(2)}, \phi^{(2)})$ based on the principles of maximum likelihood estimation similarly for all combinations of maximum likelihood candidates and, in a case where a calculated evaluation function value is smaller (or larger) than a temporarily-stored evaluation function value, updates the temporarily-stored content using the calculated evaluation function value and the corresponding angle.

Angles temporarily stored at the end of searches in the search range for all combinations of maximum likelihood candidates serve as angles at which the predetermined evaluation function $E_{ML2D}(\theta^{(1)}, \phi^{(1)}, \theta^{(2)}, \phi^{(2)})$ based on the principles of maximum likelihood estimation reaches its minimum (case where the minimum value is a maximum likelihood value) or maximum (case where the maximum value is a maximum likelihood value) among the combinations of angles searched. The horizontal/vertical maximum likelihood estimator 303 outputs the angles as horizontal and vertical two-dimensional direction-of-arrival estimate values $(\theta^{(1)}, \phi^{(1)}, \theta^{(2)}, \phi^{(2)})$. Further, the horizontal/vertical maximum likelihood estimator 303 may output, as direction-of-arrival estimation results, the angle-of-arrival estimate values thus calculated and the discrete times k and Doppler frequencies $fs\Delta\Phi$ at which they were calculated.

The foregoing has described how the direction estimator 214 according to Variation 1 operates.

As noted above, in Variation 1, the direction estimator 214 performs a horizontal and vertical two-dimensional maximum likelihood process using angles, extracted by the horizontal array maximum likelihood candidate extractor 301 and the vertical array maximum likelihood candidate extractor 302, that serve as horizontal and vertical maximum likelihood values and a plurality of angle candidates (maximum likelihood candidates) including extreme values.

For example, in a case where angular intervals in search grids are comparatively coarsely set, an extreme value may be erroneously taken as a maximum likelihood value. As opposed to this, in Variation 1, the direction estimator 214 incorporates, into the maximum likelihood candidates (angle candidates), maximum likelihood values in the search grids and extreme values that satisfy predetermined conditions (such as Eqs. (20), (22), (24), and (26)). As a result, by performing a horizontal and vertical two-dimensional maximum likelihood process using a combination of maximum likelihood candidates obtained by a horizontal and vertical one-dimensional maximum likelihood process, the direction estimator 214 can increase the probability that maximum likelihood candidates whose evaluation function values are smallest or largest (i.e. right maximum likelihood values) are obtained.

Therefore, Variation 1 makes it possible to enhance the accuracy of estimation of an angle of arrival by a horizontal and vertical two-dimensional maximum likelihood estimation.

In Variation 1, the total number of searches that are performed by the horizontal array maximum likelihood candidate extractor 301 and the vertical array maximum likelihood candidate extractor 302 is $(_{(NGH)}C_{NW}+_{(NGV)}C_{NW})$. Furthermore, an upper limit to the number of searches that are performed by the horizontal/vertical maximum likelihood estimator 303 is made to be $(N_H+1)\times(N_V+1)\times_{(Nw \times Nw)}C_{Nw}$ by limiting the search range to outputted angular ranges of the horizontal array maximum likelihood candidate extractor 301 and the vertical array maximum likelihood candidate extractor 302.

For example, even in a case where $(N_H+1)\times(N_V+1)$ is approximately 10 to 20, the number of searches $(_{(NGV)}C_{NW}+_{(NGH)}C_{NW})$ that are performed by the vertical array maximum likelihood candidate extractor 302 the horizontal array maximum likelihood candidate extractor 301 occupies a larger proportion of the total number of searches that are performed by the direction estimator 214. That is, the total number of searches that are performed by the direction estimator 214 is only insignificantly affected by an increase in the number of searches attributed to addition of extreme values other than maximum likelihood values as maximum likelihood candidates. Accordingly, as is the case with the foregoing embodiment, Variation 1 makes it possible to greatly reduce the number of searches than the conventional method and improve the accuracy of estimation of an angle of arrival by a two-dimensional maximum likelihood estimation.

Variation 2 of the Embodiment

At the time of a maximum likelihood estimation on a two-dimensional plane by the direction estimator 214 (see FIG. 6 or 11), the horizontal/vertical maximum likelihood estimator 244 or 303 may estimate, using a one-dimensional (horizontal or vertical) maximum likelihood estimate value as an initial value, the angle of arrival of an incoming wave in the two-dimensional plane while making angular grid intervals narrower by means of a maximum grade method.

This allows the direction estimator 214 to improve the accuracy of estimation of an angle of arrival with a suppressed increase in computational complexity as in the cases of the foregoing embodiment and Variation 1.

As another configuration of the direction estimator 214, the direction estimator 214 may be provided with a horizontal/vertical local searcher 401 that performs local searches at narrower search intervals using the output from the horizontal/vertical maximum likelihood estimator 244 or 303 (see FIG. 6 or 11) as an initial value. FIG. 12 is a block diagram showing an example configuration of the direction estimator 214 obtained by adding the horizontal/vertical local searcher 401 to the configuration of the foregoing embodiment (FIG. 6). Further, FIG. 13 is a block diagram showing an example configuration of the direction estimator 214 obtained by adding the horizontal/vertical local searcher 401 to the configuration of Variation 1 (FIG. 11).

In the horizontal/vertical local searcher 401, performing local searches using the output from the horizontal/vertical maximum likelihood estimator 244 or 303 as an initial value makes it possible to enhance the accuracy of estimation of an angle of arrival while suppressing an increase in computational complexity, as is the case with the foregoing embodiment and Variation 1.

Further, the horizontal/vertical maximum likelihood estimator 244 or 303 may output, to the horizontal/vertical local searcher 401, angles at which the predetermined evaluation function $E_{ML2D}(\theta^{(1)}, \phi^{(1)}, \theta^{(2)}, \phi^{(2)})$ based on the principles of maximum likelihood estimation reaches its minimum or maximum among the combinations of angles searched and a plurality of angle candidates at which the evaluation function $E_{ML2D}(\theta^{(1)}, \phi^{(1)}, \theta^{(2)}, \phi^{(2)})$ assumes a second minimum, a second maximum, or the like.

In this case, the horizontal/vertical local searcher 401 may perform local searches using, as initial values, a plurality of angle candidates that are inputted from the horizontal/vertical maximum likelihood estimator 244 or 303 and output, as a horizontal and vertical two-dimensional angle-of-arrival estimate value, an angle that is smallest or largest of evaluation function values that are obtained as local search results of the respective angle candidates.

As a result, depending on angular intervals in search grids, an extreme value may be erroneously taken as a maximum likelihood value. As opposed to this, the horizontal/vertical local searcher 401 can perform local searches in finer search grids with respect to a plurality of angle candidates, thus making it possible to increase the probability that right maximum likelihood values are obtained. This makes it possible to enhance the accuracy of estimation of an angle of arrival by a horizontal and vertical two-dimensional maximum likelihood estimation.

Alternatively, it is possible to apply, as a local search technique, the alternating projection technique described in Ilan Ziskind and Mati Wax, "Maximum Likelihood Localization of Multiple Sources by Alternating Projection," IEEE Trans. On Acoustics, Speech, and Signal Processing, Vol. 36, No. 10, October 1988, the EM technique or SAGE technique described in J. A. Fessler and A. O. Hero, "Space-alternating generalized expectation-maximization algorithm," IEEE Trans. Signal Process., vol. 42, no. 10, pp. 2664-2677, October 1994, or another technique.

Variation 3

At the time of application of a MIMO radar, Variation 3 uses an arrangement in which the horizontal and vertical array apertures of a virtual receiving array are maximally expanded. A possible example of the arrangement in which the horizontal and vertical array apertures of a virtual receiving array are maximally expanded is a case where transmitting and receiving arrays (transmitting antennas 106 and receiving antennas 202) are arranged in L shape or T shape. The arrangement of transmitting and receiving arrays is not limited to L shape or T shape.

This makes it possible to further enhance the angular resolution of the radar apparatus 10.

Figure 14A:
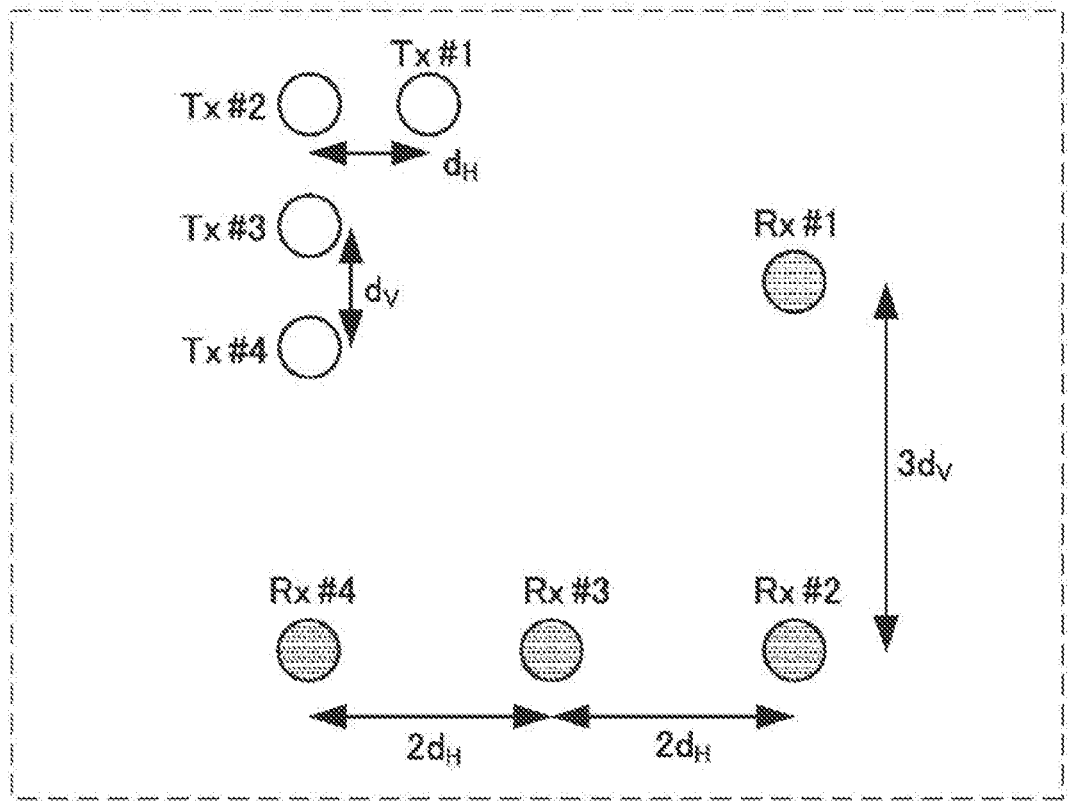
FIG. 14A is a diagram showing an example arrangement of transmitting and receiving antennas according to Variation 3 of the embodiment.

As an example, FIG. 14A shows an example of an array antenna configuration of a radar apparatus (MIMO radar) according to Variation 3.

FIG. 14A assumes that the number Nt of transmitting antennas 106 is 4 and the number Na of receiving antennas 202 is 4. Further, the three transmitting antennas 106 are denoted by Tx #1 to Tx #4, and the four receiving antennas 202 are denoted by Rx #1 to Rx #4. Further, FIG. 14B shows an arrangement of a virtual receiving array that is obtained by the antenna arrangement shown in FIG. 14A.

In FIG. 14A, the transmitting array antenna has four antennas arranged in the shape of L turned upside down, and the receiving array antenna has four antennas arranged in the shape of L turned right side left. In this case, a virtual receiving array arrangement of sixteen antennas (VA #1 to VA #16) shown in FIG. 14B is obtained.

Figure 14B:
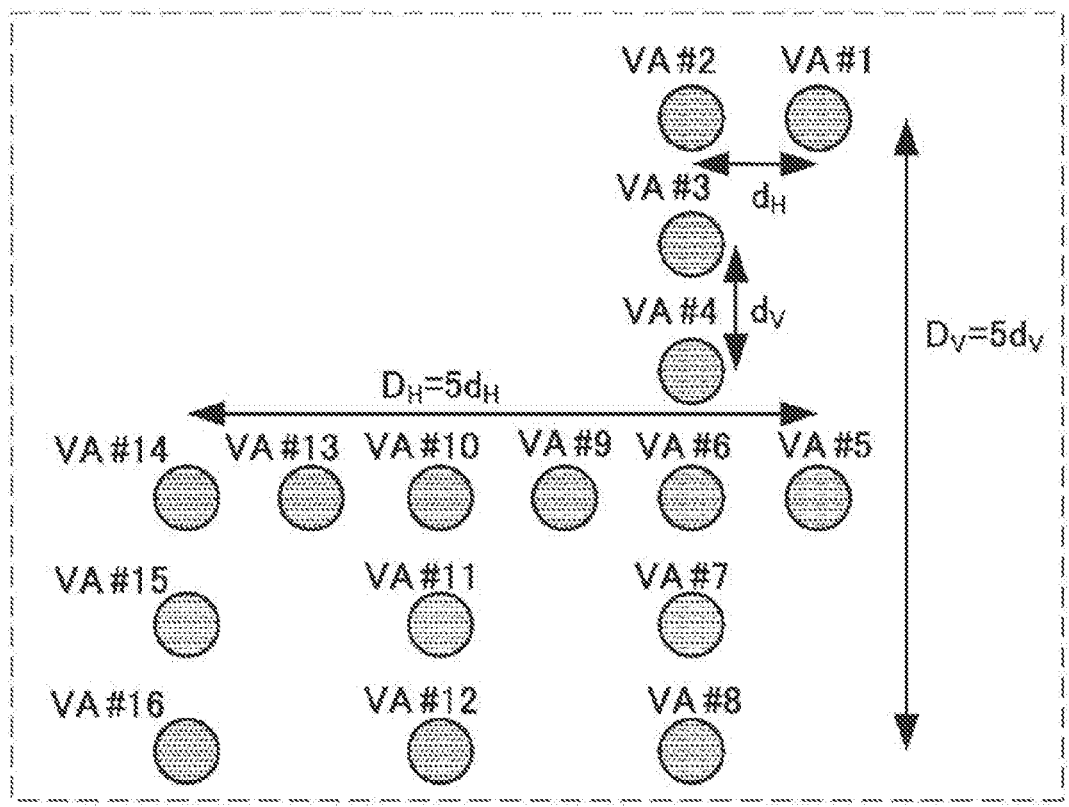
FIG. 14B is a diagram showing another example arrangement of a virtual receiving array according to Variation 3 of the embodiment.

In the virtual receiving array shown in FIG. 14B, the horizontal and vertical aperture lengths $D_H$ and $D_V$ of the antennas are expressed as $D_H=5d_H$ and $D_V=5d_V$, respectively. Note here that $d_H$ denotes horizontal interelement spacings between transmitting array antennas and $d_V$ denotes vertical interelement spacings between transmitting array antennas.

In the case of FIG. 14B, the horizontal array maximum likelihood estimator 242 shown in FIG. 6 (or the horizontal array maximum likelihood candidate extractor 301 shown in FIG. 11) can use horizontal array correlation vectors $\{h_{subH(1)}(k, fs, w), h_{SubH(2)}(k, fs, w), h_{SubH(3)}(k, fs, w)\}$ of $N_{VAH}=6, 3, 3$ (i.e. $N_{SubH}=3$ virtual horizontal linear arrays). The element numbers of the virtual receiving array correlation vectors $h_{after\_cal}(k, fs, w)$ included in the horizontal array correlation vectors are {VA #5, VA #6, VA #9, VA #10, VA #13, VA #14}, {VA #7, VA #11, VA #15}, {VA #8, VA #12, VA#16}, respectively.

Further, the horizontal array directional vectors $\{a_{SubH(1)}(\theta_u, a), a_{SubH(2)}(\theta_u, a), a_{SubH(3)}(\theta_u, \alpha)\}$ corresponding to the horizontal array correlation vectors $\{h_{subH(1)}(k, fs, w), h_{SubH(2)}(k, fs, w), h_{SubH(3)}(k, fs, w)\}$ are column vectors that are constituted by extracting the element numbers {VA #5, VA #6, VA #9, VA #10, VA #13, VA #14}, {VA #7, VA #11, VA #15}, {VA #8, VA #12, VA#16} of the directional vectors $a(\theta_u, \phi_v)$ of the virtual receiving array, respectively.

The horizontal array maximum likelihood estimator 242 (or the horizontal array maximum likelihood candidate extractor 301) may select and use, as a horizontal array correlation vector for use in a maximum likelihood estimation process, only a horizontal array correlation vector with the longest aperture length. For example, in the case of FIG. 14B, the horizontal array correlation vector $h_{SubH(1)}(k, fs, w)$ of $N_{VAH}=6$ is used as the horizontal array correlation vector with the longest aperture length. This makes it possible to reduce computational complexity of evaluation function values.

Further, in the case of FIG. 14B, the vertical array maximum likelihood estimator 243 shown in FIG. 6 (or the vertical array maximum likelihood candidate extractor 302 shown in FIG. 11) can use vertical array correlation vectors $\{h_{SubV(1)}(k, fs, w), h_{SubV(2)}(k, fs, w), h_{SubV(3)}(k, fs, w)\}$ of $N_{VAv}=6, 3, 3$ (i.e. $N_{SubV}=3$ virtual vertical linear arrays). The element numbers of the virtual receiving array correlation vectors $h_{after\_cal}(k, fs, w)$ included in the vertical array correlation vectors are {VA #2, VA #3, VA #4, VA #6, VA #7, VA #8}, {VA #10, VA #11, VA #12}, {VA #14, VA #15, VA #16}, respectively.

Further, the vertical array directional vectors $\{a_{SubV(1)}(\alpha_{SV}, \phi_v), a_{SubV(2)}(\alpha_{SV}, \phi_v), a_{SubV(3)}(\alpha_{SV}, \phi_v)\}$ corresponding to the vertical array correlation vectors $\{h_{subV(1)}(k, fs, w), h_{SubV(2)}(k, fs, w), h_{SubV(3)}(k, fs, w)\}$ are column vectors that are constituted by extracting the element numbers {VA #2, VA #3, VA #4, VA #6, VA #7, VA #8}, {VA #10, VA #11, VA #12}, {VA #14, VA #15, VA #16} of the directional vectors $a(\theta_u, \phi_v)$ of the virtual receiving array, respectively.

The vertical array maximum likelihood estimator 243 (or the vertical array maximum likelihood candidate extractor 302) may select and use, as a vertical array correlation vector for use in a maximum likelihood estimation process, only a vertical array correlation vector with the longest aperture length. For example, in the case of FIG. 14B, the vertical array correlation vector $h_{SubV(1)}(k, fs, w)$ of $N_{VAH}=6$ is used as the vertical array correlation vector with the longest aperture length. This makes it possible to reduce computational complexity of evaluation function values.

Note here that the transmitting and receiving array antennas (FIG. 14A) according to Variation 3 and the transmitting and receiving antennas shown in FIG. 1A are both composed of four transmitting antennas and four receiving antennas. In the virtual receiving array shown in FIG. 1B, the horizontal and vertical aperture lengths are $3d_H$ and $3d_V$, respectively. As opposed to this, in Variation 3, as shown in FIG. 14B, the horizontal and vertical aperture lengths are $5d_H$ and $5d_V$, respectively. That is, in comparison with FIG. 1B, Variation 3 makes it possible to increase the aperture lengths of the virtual receiving array, although it is composed of the same number of transmitting and receiving antennas.

As is the case with Variation 3, using an arrangement of transmitting and receiving array antennas in L shape (see FIG. 14A) or T shape (not illustrated) makes it possible to maximally increase the number of elements ($N_{VAH}$ or $N_{VAV}$) of a horizontal array correlation vector or a vertical array correlation vector to maximally expand the aperture lengths of a virtual horizontal linear array or a virtual vertical linear array. This makes it possible to improve the accuracy of estimation of an angle of arrival in a horizontal or vertical direction.

The foregoing has described embodiments according to an aspect of the present disclosure.

It should be noted that a proper combination of actions according to the embodiments and variations may be carried out.

Other Embodiments (1) The number of transmitting antennas Nt is not limited to the three elements shown in FIG. 7A or the four elements shown in FIG. 14A, and the number of receiving antennas Na is not limited to the three elements shown in FIG. 7A or the four elements shown in FIG. 14A. Further, the present disclosure is not limited to the transmitting and receiving array antenna arrangements (virtual receiving array arrangements) shown in FIGS. 7A, 7B, 14A, and 14B and is applicable to virtual receiving arrays two-dimensionally arranged in horizontal and vertical directions.

(2) Although the foregoing embodiments have described cases where a coded pulse radar is used, the present disclosure is also applicable to a radar system, such as a chirp pulse radar, that uses frequency-modulated pulse waves.

(3) Although the foregoing embodiment has described, as an example, a case where a direction-of-arrival estimation is made using a virtual receiving array determined by an arrangement of transmitting and receiving array antennas of a MIMO radar, the present disclosure is not limited to this and is also applicable to a case where a direction-of-arrival estimation is made using a plurality of receiving array antennas two-dimensionally arranged in horizontal and vertical directions with a single transmitting antenna.

(4) In the radar apparatus 10 shown in FIG. 1, the radar transmitter 100 and the radar receiver 200 may be individually placed in physically separated places. Further, in the radar apparatus 200 shown in FIG. 2, the direction estimator 214 (direction-of-arrival estimation device) and the other components may be individually placed in physically separated places.

(5) Although not illustrated, the radar apparatus 10 includes, for example, a central processing unit (CPU), a storage medium (read-only memory (ROM)) having a control program stored thereon, and a working memory such as a RAM (random-access memory). In this case, the functions of the components described above are achieved by the CPU executing the control program. Note, however, that the radar apparatus 10 is not limited in hardware configuration to such an example. For example, the functional components of the radar apparatus 10 may be achieved as ICs (integrated circuits). These functional components may take the form of individual single chips or of a single chip including some or all of the functional components.

In the foregoing, various embodiments have been described with reference to the drawings. However, the present disclosure is of course not limited to such examples. It is apparent that persons skilled in the art can conceive of various changes and alterations within the scope of claims, and such changes and alterations are naturally understood as pertaining to the technical scope of the present disclosure. Each constituent element in the embodiments described above may be arbitrarily combined with the other without departing from the spirit of the disclosure.

Although each of the foregoing embodiments has been described by giving an example where the present disclosure is configured with hardware, the present disclosure may alternatively be achieved with software in cooperation with hardware.

Further, the functional blocks used in the description of each embodiment described above are typically achieved as LSIs, which are integrated circuits. The integrated circuits may control the functional blocks used in the description of the embodiments above and each include an input terminal and an output terminal. These LSIs may take the form of individual single chips or of a single chip including some or all of them. Depending on the degree of integration, the LSIs may alternatively be referred to as "ICs", "system LSIs", "super LSIs", or "ultra LSIs".

However, the technique of implementing an integrated circuit is not limited to the LSI and may be realized by using a dedicated circuit or a general-purpose processor. In addition, an FPGA (field-programmable gate array) that can be programmed after the manufacture of the LSI or a reconfigurable processor in which the connections and the settings of circuit cells disposed inside the LSI can be reconfigured may be used.

If future integrated circuit technology replaces LSIs as a result of the advancement of semiconductor technology or other derivative technology, the functional blocks could be integrated using the future integrated circuit technology. Biotechnology can also be applied.

SUMMARY OF THE PRESENT DISCLOSURE

A radar apparatus according to the present disclosure includes a transmitter that transmits a radar signal through a transmitting array antenna; a receiver that receives, through a receiving array antenna, a reflected-wave signal produced by the radar signal being reflected by a target; and a direction estimator that estimates an angle of arrival of the reflected-wave signal thus received. The direction estimator includes a first estimator that, by performing a maximum likelihood estimation process on a first direction, calculates, using signals received by a first virtual linear array constituted by virtual receiving antennas, linearly arranged in the first direction, that belong to a plurality of virtual receiving antennas included in a virtual receiving array constituted on the basis of an arrangement of the transmitting array antennas and the receiving array antennas, first maximum likelihood values corresponding to NW (where NW is an integer of 1 or larger) angles in the first direction and extracts first candidate angles of arrival of incoming waves in the first direction including at least the first maximum likelihood values, a second estimator that, by performing a maximum likelihood estimation process on a second direction that is orthogonal to the first direction, calculates, using signals received by a second virtual linear array constituted by virtual receiving antennas, linearly arranged in the second direction, that belong to the plurality of virtual receiving antennas, second maximum likelihood values corresponding to the NW angles in the second direction and extracts second candidate angles of arrival of incoming waves in the second direction including at least the second maximum likelihood values, and a third estimator that estimates, using the first and second candidate angles of arrival, angles of arrival of the NW incoming waves in a two-dimensional plane extending in the first and second directions.

In the radar apparatus according to the present disclosure, the third estimator determines the angles of arrival of the NW incoming waves in the two-dimensional plane from among combinations of the NW angles corresponding to the first maximum likelihood values and the NW angles corresponding to the second maximum likelihood values.

In the radar apparatus according to the present disclosure, the first estimator extracts the first candidate angles of arrival including the NW angles corresponding to the first maximum likelihood values and the NW angles corresponding to at least one extreme value other than the first maximum likelihood values in a first evaluation function that is used in the maximum likelihood estimation process, the second estimator extracts the second candidate angles of arrival including the NW angles corresponding to the second maximum likelihood values and the NW angles corresponding to at least one extreme value other than the second maximum likelihood values in a second evaluation function that is used in the maximum likelihood estimation process, and the third estimator determines the angles of arrival of the NW incoming waves in the two-dimensional plane from among combinations of the first and second candidate angles of arrival.

In the radar apparatus according to the present disclosure, the third estimator estimates the angles of arrival of the NW incoming waves in the two-dimensional plane by performing a maximum likelihood estimation process on the two-dimensional plane with respect to combinations of the first and second candidate angles of arrival.

In the radar apparatus according to the present disclosure, the third estimator estimates the angles of arrival of the NW incoming waves in the two-dimensional plane by a maximum grade method using the first and second candidate angles of arrival as initial values.

In the radar apparatus according to the present disclosure, the maximum likelihood estimation process involves use of an evaluation function including signals received by the virtual receiving antennas and directional vectors of the virtual receiving antennas, and the evaluation function uses parameters including prestored parameters pertaining to the directional vectors.

A direction-of-arrival estimation device according to the present disclosure is a direction-of-arrival estimation device for estimating angles of arrival of signals received through a plurality of receiving antennas, including: a first estimator that, by performing a maximum likelihood estimation process on a first direction, calculates, using signals received by a first linear array constituted by receiving antennas, linearly arranged in the first direction, that belong to the plurality of receiving antennas, first maximum likelihood values corresponding to NW (where NW is an integer of 1 or larger) angles in the first direction and extracts first candidate angles of arrival of incoming waves in the first direction including at least the first maximum likelihood values; a second estimator that, by performing a maximum likelihood estimation process on a second direction that is orthogonal to the first direction, calculates, using signals received by a second linear array constituted by receiving antennas, linearly arranged in the second direction, that belong to the plurality of receiving antennas, second maximum likelihood values corresponding to the NW angles in the second direction and extracts second candidate angles of arrival of incoming waves in the second direction including at least the second maximum likelihood values; and a third estimator that estimates, using the first and second candidate angles of arrival, angles of arrival of the NW incoming waves in a two-dimensional plane extending in the first and second directions.

The present disclosure is applicable as a radar apparatus that performs detection in a wide angular range.

What is claimed is:

1. A radar apparatus comprising:
    a transmitter that transmits a radar signal through a transmitting array antenna;
    a receiver that receives, through a receiving array antenna, a reflected-wave signal produced by the radar signal being reflected by a target; and
    a direction estimator that estimates an angle of arrival of the reflected-wave signal, and outputs an estimation result indicating the angle of arrival of the reflected-wave signal,
    wherein the direction estimator includes
        a first estimator that, by performing a maximum likelihood estimation process on a first direction, calculates, using signals received by a first virtual linear array constituted by virtual receiving antennas, linearly arranged in the first direction, that belong to a plurality of virtual receiving antennas included in a virtual receiving array constituted on the basis of an arrangement of the transmitting array antennas and the receiving array antennas, first maximum likelihood values corresponding to NW (where NW is an integer of 1 or larger) angles in the first direction and extracts first candidate angles of arrival of incoming waves in the first direction including at least the first maximum likelihood values,
        a second estimator that, by performing a maximum likelihood estimation process on a second direction that is orthogonal to the first direction, calculates, using signals received by a second virtual linear array constituted by virtual receiving antennas, linearly arranged in the second direction, that belong to the plurality of virtual receiving antennas, second maximum likelihood values corresponding to the NW angles in the second direction and extracts second candidate angles of arrival of incoming waves in the second direction including at least the second maximum likelihood values, and
        a third estimator that estimates, using the first and second candidate angles of arrival, angles of arrival of the NW incoming waves in a two-dimensional plane extending in the first and second directions, and
    wherein the radar apparatus outputs an estimation result indicating a presence of a target and a direction of the target.

2. The radar apparatus according to claim 1, wherein the third estimator determines the angles of arrival of the NW incoming waves in the two-dimensional plane from among combinations of the NW angles corresponding to the first maximum likelihood values and the NW angles corresponding to the second maximum likelihood values.

3. The radar apparatus according to claim 1, wherein the first estimator extracts the first candidate angles of arrival including the NW angles corresponding to the first maximum likelihood values and the NW angles corresponding to at least one extreme value other than the first maximum likelihood values in a first evaluation function that is used in the maximum likelihood estimation process,
    the second estimator extracts the second candidate angles of arrival including the NW angles corresponding to the second maximum likelihood values and the NW angles corresponding to at least one extreme value other than the second maximum likelihood values in a second evaluation function that is used in the maximum likelihood estimation process, and
    the third estimator determines the angles of arrival of the NW incoming waves in the two-dimensional plane from among combinations of the first and second candidate angles of arrival.

4. The radar apparatus according to claim 1, wherein the third estimator estimates the angles of arrival of the NW incoming waves in the two-dimensional plane by performing a maximum likelihood estimation process on the two-dimensional plane with respect to combinations of the first and second candidate angles of arrival.

5. The radar apparatus according to claim 1, wherein the third estimator estimates the angles of arrival of the NW incoming waves in the two-dimensional plane by a maximum grade method using the first and second candidate angles of arrival as initial values.

6. The radar apparatus according to claim 1, wherein the maximum likelihood estimation process involves use of an evaluation function including signals received by the virtual receiving antennas and directional vectors of the virtual receiving antennas, and
    the evaluation function uses parameters including pre-stored parameters pertaining to the directional vectors.

7. A direction-of-arrival estimation device for estimating angles of arrival of signals received through a plurality of receiving antennas, comprising:
    a first estimator that, by performing a maximum likelihood estimation process on a first direction, calculates, using signals received by a first linear array constituted by receiving antennas, linearly arranged in the first direction, that belong to the plurality of receiving antennas, first maximum likelihood values corresponding to NW (where NW is an integer of 1 or larger) angles in the first direction and extracts first candidate angles of arrival of incoming waves in the first direction including at least the first maximum likelihood values;
    a second estimator that, by performing a maximum likelihood estimation process on a second direction that is orthogonal to the first direction, calculates, using signals received by a second linear array constituted by receiving antennas, linearly arranged in the second direction, that belong to the plurality of receiving antennas, second maximum likelihood values corresponding to the NW angles in the second direction and extracts second candidate angles of arrival of incoming waves in the second direction including at least the second maximum likelihood values; and a third estimator that estimates, using the first and second candidate angles of arrival, angles of arrival of the NW incoming waves in a two-dimensional plane extending in the first and second directions, and outputs an estimation result indicating the angles of arrival of the NW incoming waves, wherein the direction-of-arrival estimation device outputs an estimation result indicating a presence of a target and a direction of the target.

* * * * *